(12) United States Patent
Burton et al.

(10) Patent No.: US 11,505,501 B1
(45) Date of Patent: Nov. 22, 2022

(54) SINTERED LITHIUM COBALTITE ELECTRODES

(71) Applicant: Corning Incorporated, Corning, NY (US)

(72) Inventors: Yvonne Marie Burton, Addison, NY (US); Yinghong Chen, Painted Post, NY (US); Bethany Rose Conway, Lindley, NY (US); Josiah M Lorenzo, Painted Post, NY (US); Cameron Wayne Tanner, Horseheads, NY (US); Lingyan Wang, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/407,677

(22) Filed: Aug. 20, 2021

(51) Int. Cl.
*H01M 4/02* (2006.01)
*C04B 35/64* (2006.01)
*H01M 4/1315* (2010.01)
*H01M 4/04* (2006.01)
*C01G 51/00* (2006.01)

(52) U.S. Cl.
CPC ............ *C04B 35/64* (2013.01); *C01G 51/42* (2013.01); *H01M 4/0471* (2013.01); *H01M 4/1315* (2013.01); *C04B 2235/3203* (2013.01); *C04B 2235/6025* (2013.01); *C04B 2235/656* (2013.01)

(58) Field of Classification Search
CPC ...................................................... H01M 4/02
See application file for complete search history.

(56) References Cited

U.S. PATENT DOCUMENTS

| 5,473,008 | A | 12/1995 | Hessel et al. |
| 2015/0232390 | A1 | 8/2015 | Xie et al. |
| 2020/0020944 | A1* | 1/2020 | Park ..................... H01M 4/366 |
| 2021/0344040 | A1* | 11/2021 | Donnelly ............ C04B 35/6342 |

FOREIGN PATENT DOCUMENTS

| CN | 105039830 B | | 3/2017 |
| EP | 0473236 A2 | | 3/1992 |
| EP | 0725047 A1 | | 8/1996 |
| IN | 201841011287 | | 3/2018 |
| JP | 2012-099225 | * | 5/2012 |
| WO | 2011/086650 A1 | | 7/2011 |

OTHER PUBLICATIONS

Blugan et al., "Development of a Tape Casting Process for Making Thin Layers of Si3N4 and Si3N4 + TiN", Journal of the European Ceramic Society, vol. 27(16), 2017, pp. 4789-4795.

(Continued)

*Primary Examiner* — Jacob B Marks
(74) *Attorney, Agent, or Firm* — Kevin M. Johnson

(57) ABSTRACT

A method for forming a sintered composition including providing a slurry precursor including a lithium-, sodium-, or magnesium-based compound; tape casting the slurry precursor to form a green tape; and sintering the green tape at a temperature in a range of 500° C. to 1350° C. for a time in a range of less than 60 min to form a sintered composition, such that the slurry precursor further includes a solvent and dispersant. The dispersant may include an amine compound, a carboxylic acid compound, or combinations, mixtures, or salts thereof.

27 Claims, 10 Drawing Sheets

(56) References Cited

OTHER PUBLICATIONS

Julien et al., "Sputtered LiCoO2 Cathode Materials for All-Solid-State Thin-Film Lithium Microbatteries", In Materials, vol. 12, 2019, 26 pages.

Kim et al., "Laser materials processing for micropower source applications: a review", Journal of Photonics for Energy, vol. 4, 040992, 2014.

Maiti et al., "Terpineol as a dispersant for tape casting yttria stabilized zirconia powder", Materials Science and Engineering: A, vol. 333, Issues 1-2, 2002, pp. 35-40.

Mizushima et al., "LixCoO2 (0<x<-1): A new cathode material for batteries of high energy density". Materials Research Bulletin, vol. 15, Issue 6, Jun. 1980, pp. 783-789.

Moreno et al., "Oil-related deflocculants for tape casting slips", Journal of the European Ceramic Society, vol. 17(2-3), 1997, pp. 351-357.

Nitta et al., "Li-ion battery materials: present and future", Materials Today vol. 18, No. 5, 2015, 13 pages.

Nourhan et al., "Recent advances in the design of cathode materials for Li-ion batteries", RSC Adv., vol. 10, 2020, pp. 21662-21685.

Rocak et al., "Ceramic suspension optimization using factorial design of experiments", Journal of the European Ceramic Society, vol. 22, Issue 4, 2002, pp. 391-395.

Sahraneshin et al., "Synthesis and morphology control of surface functionalized nanoscale yttrium aluminum garnet particles via supercritical hydrothermal method", Progress in Crystal Growth and Characterization of Materials, vol. 58, No. 1, 2012, pp. 43-50.

Wang et al., "Monodispersed Core-Shell Fe3O4@Au Nanoparticles", J. Phys. Chem. B, vol. 109, Issue 46, 2005, pp. 21593-2160.

Whittingham, "Special Editorial Perspective: Beyond Li-Ion Battery Chemistry", Chem. Review, vol. 120, No. 14, 2020, pp. 6328-6330.

Zou et al., "Forming nanometer TiO2 sheets by nonaqueous tape casting", Ceramics International vol. , 33(3), 2007, pp. 477-481.

* cited by examiner

| Order # | Sample # | Sample ID | Acid:Base | wt% dispersant to LCO | 10% (μm) | 50% (μm) | 90% (μm) |
|---|---|---|---|---|---|---|---|
| 1540286 | 1 | Exp I Condition 0 | | 0 | 0.339 | 0.677 | 1.319 |
| 1540287 | 2 | Exp I Condition 1 | (FO : OAM) =1:0 | 1.95% | 0.365 | 0.785 | 1.602 |
| 1540288 | 3 | Exp I Condition 2 | (FO : OAM) =1:1 | 3.90% | 0.291 | 0.578 | 1.319 |
| 1540289 | 4 | Exp I Condition 3 | (FO : OAM) =1:1 (half) | 1.95% | 0.31 | 0.601 | 1.247 |
| 1540290 | 5 | Exp I Condition 4 | (FO : OAM) =3:1 | 1.95% | 0.319 | 0.639 | 1.32 |
| 1540291 | 6 | Exp I Condition 5 | (FO : OAM) =1:3 | 1.95% | 0.289 | 0.542 | 1.209 |
| 1540292 | 7 | Exp I Condition 6 | (FO : OAM) =0:1 | 1.95% | 0.265 | 0.467 | 0.995 |
| 1540293 | 8 | Exp I Condition 1A | (OA : OAM) =1:0 | 1.95% | 0.293 | 0.592 | 1.249 |
| 1540294 | 9 | Exp I Condition 2A | (OA : OAM) =1:1 | 3.90% | 0.269 | 0.49 | 1.09 |
| 1540295 | 10 | Exp I Condition 3A | (OA : OAM) =1:1 (half) | 1.95% | 0.279 | 0.531 | 1.115 |
| 1540296 | 11 | Exp I Condition 4A | (OA : OAM) = 3:1 | 1.95% | 0.269 | 0.495 | 1.081 |
| 1540297 | 12 | Exp I Condition 5A | (OA : OAM) =1:3 | 1.95% | 0.271 | 0.493 | 1.057 |

FIG. 6B

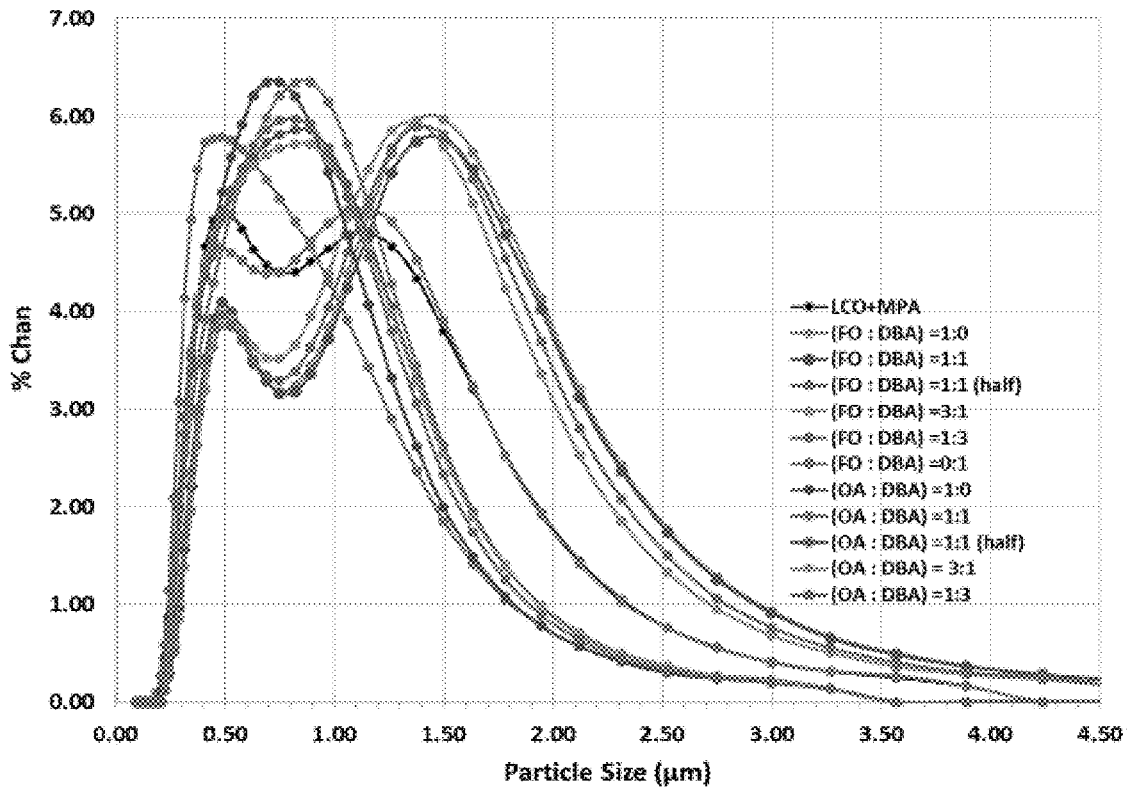

FIG. 7A

| Sample # | Sample ID | Acid Base | wt% dispersant to LCO | 10% (μm) | 50% (μm) | 90% (μm) |
|---|---|---|---|---|---|---|
| 1 | Exp II Condition 0 | | 0 | 0.349 | 0.729 | 1.608 |
| 2 | Exp II Condition 1 | (FO : DBA) =1:0 | 1.95% | 0.399 | 1.044 | 2.047 |
| 3 | Exp II Condition 2 | (FO : DBA) =1:1 | 3.90% | 0.387 | 1.01 | 2.027 |
| 4 | Exp II Condition 3 | (FO : DBA) =1:1 (half) | 1.95% | 0.344 | 0.753 | 1.607 |
| 5 | Exp II Condition 4 | (FO : DBA) =3:1 | 1.95% | 0.385 | 0.962 | 1.884 |
| 6 | Exp II Condition 5 | (FO : DBA) =1:3 | 1.95% | 0.381 | 0.983 | 1.938 |
| 7 | Exp II Condition 6 | (FO : DBA) =0:1 | 1.95% | 0.307 | 0.574 | 1.236 |
| 8 | Exp II Condition 1A | (OA : DBA) =1:0 | 1.95% | 0.332 | 0.65 | 1.255 |
| 9 | Exp II Condition 2A | (OA : DBA) =1:1 | 3.90% | 0.353 | 0.714 | 1.343 |
| 10 | Exp II Condition 3A | (OA : DBA) =1:1 (half) | 1.95% | 0.339 | 0.684 | 1.339 |
| 11 | Exp II Condition 4A | (OA : DBA) = 3:1 | 1.95% | 0.335 | 0.675 | 1.338 |
| 12 | Exp II Condition 5A | (OA : DBA) =1:3 | 1.95% | 0.334 | 0.67 | 1.305 |

FIG. 7B

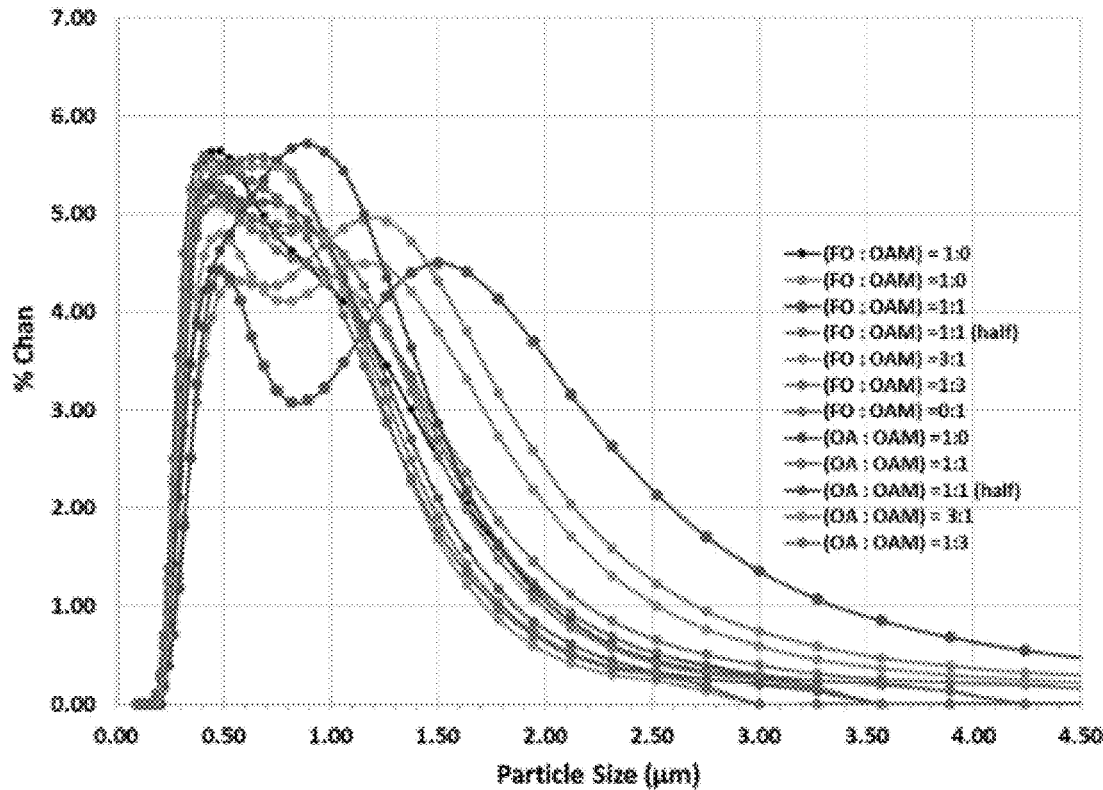

FIG. 8A

| Sample # | Sample ID | Acid:Base | wt% dispersant to LCO | 10% (μm) | 50% (μm) | 90% (μm) |
|---|---|---|---|---|---|---|
| 1 | Exp III Condition 0 | | | 0.32 | 0.613 | 1.412 |
| 2 | Exp III Condition 1 | (FO : OAM) =1:0 | 1.95% | 0.37 | 0.853 | 1.922 |
| 3 | Exp III Condition 2 | (FO : OAM) =1:1 | 3.90% | 0.38 | 0.95 | 2.38 |
| 4 | Exp III Condition 3 | (FO : OAM) =1:1 (half) | 1.95% | 0.33 | 0.648 | 1.517 |
| 5 | Exp III Condition 4 | (FO : OAM) =3:1 | 1.95% | 0.34 | 0.742 | 1.75 |
| 6 | Exp III Condition 5 | (FO : OAM) =1:3 | 1.95% | 0.32 | 0.645 | 1.421 |
| 7 | Exp III Condition 6 | (FO : OAM) =0:1 | 1.95% | 0.31 | 0.599 | 1.225 |
| 8 | Exp III Condition 1A | (OA : OAM) =1:0 | 1.95% | 0.34 | 0.704 | 1.395 |
| 9 | Exp III Condition 2A | (OA : OAM) =1:1 | 3.90% | 0.31 | 0.623 | 1.359 |
| 10 | Exp III Condition 3A | (OA : OAM) =1:1 (half) | 1.95% | 0.3 | 0.597 | 1.275 |
| 11 | Exp III Condition 4A | (OA : OAM) =3:1 | 1.95% | 0.3 | 0.579 | 1.177 |
| 12 | Exp III Condition 5A | (OA : OAM) =1:3 | 1.95% | 0.3 | 0.566 | 1.199 |

FIG. 8B

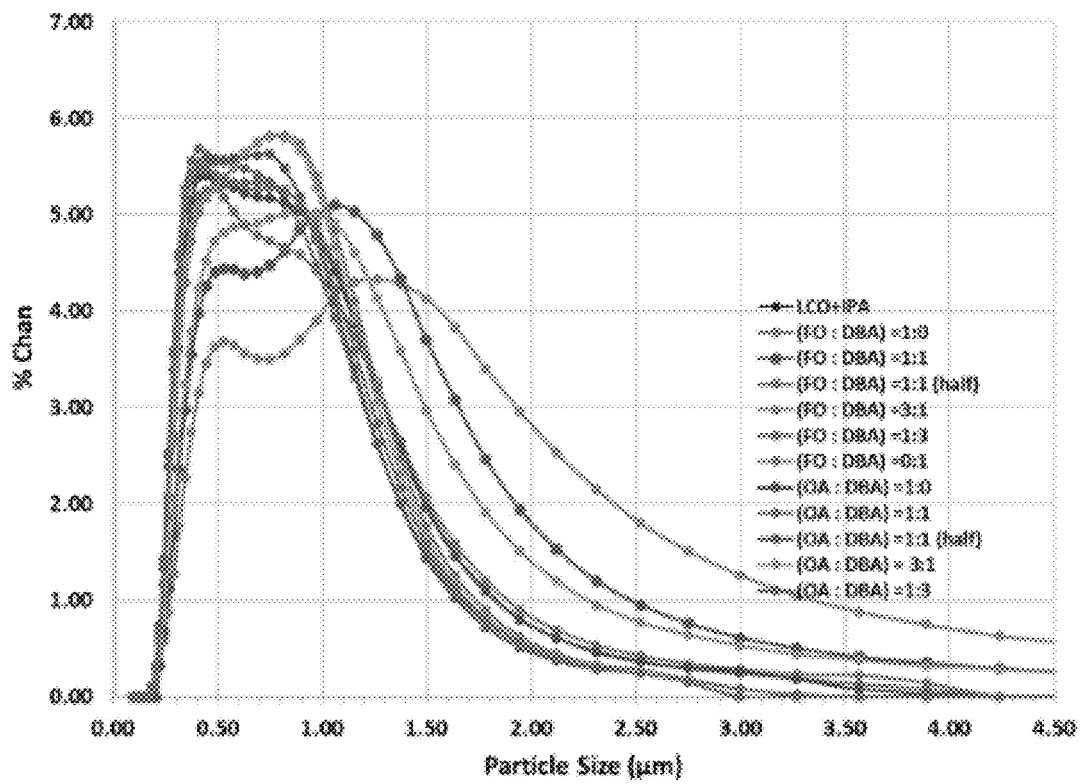

FIG. 9A

| Sample # | Sample ID | Acid:Base | wt% dispersant to LCO | 10% (μm) | 50% (μm) | 90% (μm) |
|---|---|---|---|---|---|---|
| 2 | Exp IV Condition 1 | (FO : DBA) =1:0 | 1.95% | 0.377 | 0.99 | 3.05 |
| 3 | Exp IV Condition 2 | (FO : DBA) =1:1 | 3.90% | 0.352 | 0.786 | 1.754 |
| 4 | Exp IV Condition 3 | (FO : DBA) =1:1 (half) | 1.95% | 0.309 | 0.61 | 1.277 |
| 5 | Exp IV Condition 4 | (FO : DBA) =3:1 | 1.95% | 0.338 | 0.719 | 1.63 |
| 6 | Exp IV Condition 5 | (FO : DBA) =1:3 | 1.95% | 0.296 | 0.559 | 1.15 |
| 7 | Exp IV Condition 6 | (FO : DBA) =0:1 | 1.95% | 0.3 | 0.593 | 1.311 |
| 8 | Exp IV Condition 1A | (OA : DBA) =1:0 | 1.95% | 0.308 | 0.6 | 1.268 |
| 9 | Exp IV Condition 2A | (OA : DBA) =1:1 | 3.90% | 0.315 | 0.62 | 1.2 |
| 10 | Exp IV Condition 3A | (OA : DBA) =1:1 (half) | 1.95% | 0.3 | 0.57 | 1.136 |
| 11 | Exp IV Condition 4A | (OA : DBA) = 3:1 | 1.95% | 0.309 | 0.608 | 1.179 |
| 12 | Exp IV Condition 5A | (OA : DBA) =1:3 | 1.95% | 0.296 | 0.57 | 1.162 |
FIG. 9B
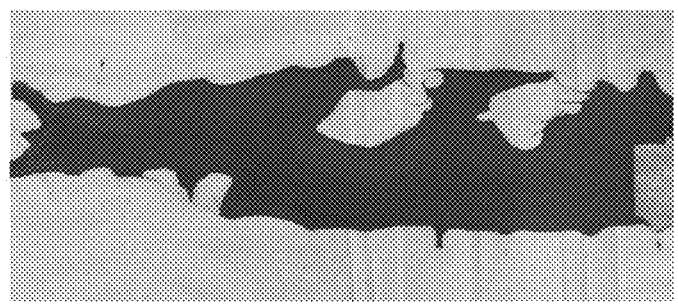
FIG. 10A
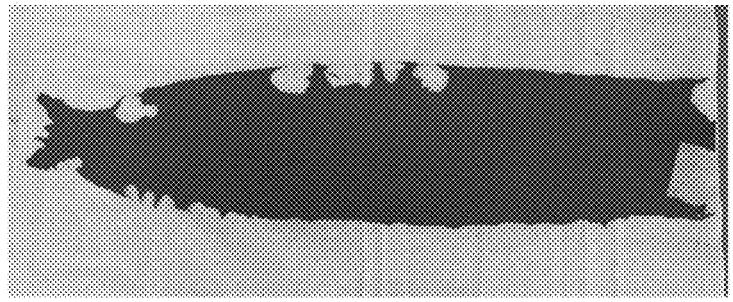
FIG. 10B
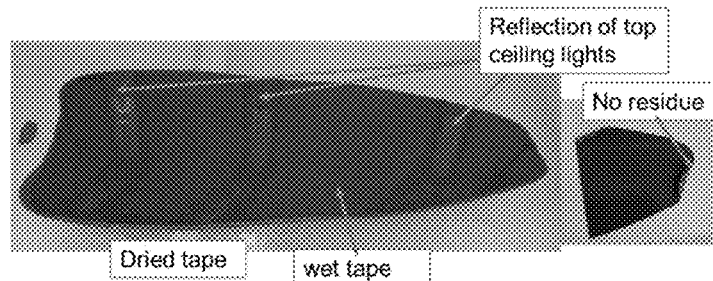
FIG. 11A

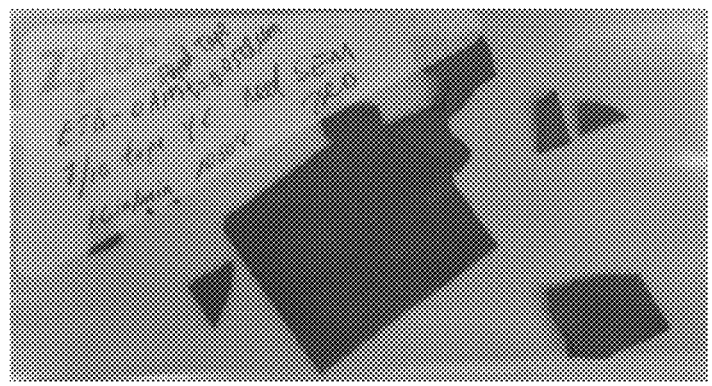
FIG. 14C
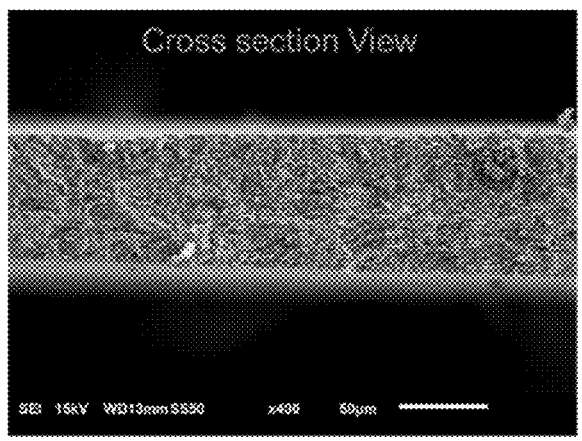 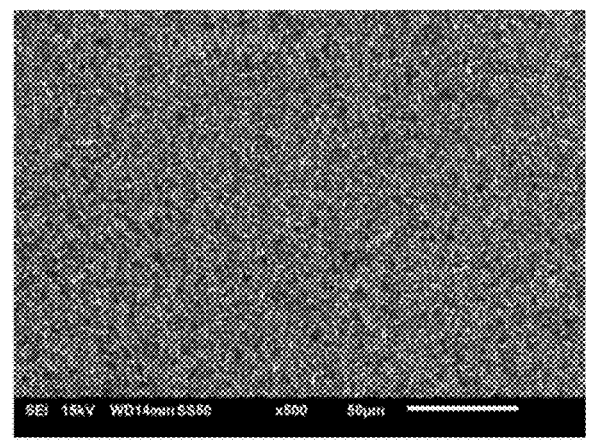
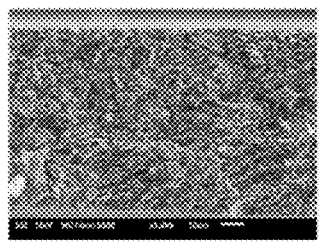 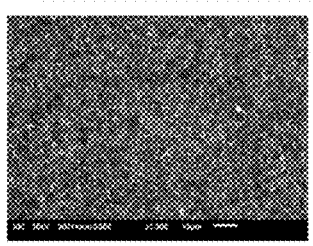
FIGS. 15A　　　　　　　　　　　FIGS. 15B

SINTERED LITHIUM COBALTITE ELECTRODES

BACKGROUND

1. Field

This disclosure relates to sintered lithium cobaltite electrodes for Li-ion batteries.

2. Technical

Lithium cobaltite (LCO) (LiCoO$_2$) is used in a majority of commercial Li-ion batteries (LIBs) because of its relatively high theoretical specific capacity (e.g., ~274 mAh/g), high theoretical volumetric capacity (e.g., ~1363 mAh/cm$^3$), low self-discharge, high discharge voltage, and good cycling performance.

In general, cathodes of LIBs may be prepared by including oxide or carbonaceous powder with organic binder, with the processing carried out by a slurry-based coating process. However, challenges remain in LCO tape casting and sintering processes, such as poor dispersity in solvent, slip dewetting on the carrier film, and tape burning at binder burnout process. These problems result in the final cathode lacking sufficient density characteristics, thereby affecting energy density of LIBs.

This disclosure reports new formulations to solve the LCO dispersion, slip dewetting, and tape burning issues, as well as continuous casting and rapid sintering for making sintered LiCoO$_2$ electrode.

SUMMARY

In some embodiments, a method for forming a sintered composition, comprises: providing a slurry precursor including a lithium-, sodium-, or magnesium-based compound; tape casting the slurry precursor to form a green tape; and sintering the green tape at a temperature in a range of 500° C. to 1350° C. for a time in a range of less than 60 min to form a sintered composition, wherein the slurry precursor further comprises a solvent and dispersant.

In one aspect, which is combinable with any of the other aspects or embodiments, the dispersant comprises an amine compound, a carboxylic acid compound, or combinations, mixtures, or salts thereof. In one aspect, which is combinable with any of the other aspects or embodiments, the amine compound comprises oleylamine, dibutylamine, or combinations thereof. In one aspect, which is combinable with any of the other aspects or embodiments, the amine compound comprises at least one amino group, at least one imino group, or combinations thereof, wherein the at least one amino group or at least one imino group contains alkyl chains or aromatic rings, and wherein the amine compound has less than 30 carbon atoms. In one aspect, which is combinable with any of the other aspects or embodiments, the carboxylic acid compound comprises oleic acid. In one aspect, which is combinable with any of the other aspects or embodiments, the carboxylic acid compound comprises R—COOH structured molecules, where R is an alkyl chain or aromatic ring, and wherein the R—COOH structured molecules have less than 30 carbon atoms. In one aspect, which is combinable with any of the other aspects or embodiments, the dispersant comprises combinations, mixtures, or salts of the amine compound and the carboxylic acid compound and wherein a ratio of the carboxylic acid compound to the amine compound is 0:1 to 1:0. In one aspect, which is combinable with any of the other aspects or embodiments, the ratio of the carboxylic acid compound to the amine compound is 1:3 to 3:1. In one aspect, which is combinable with any of the other aspects or embodiments, the ratio of the carboxylic acid compound to the amine compound is at least 1:4.

In one aspect, which is combinable with any of the other aspects or embodiments, the lithium-, sodium-, or magnesium-based compound has a D50 particle size of at most 0.6 µm.

In one aspect, which is combinable with any of the other aspects or embodiments, the solvent comprises 1-methoxy-2-propanyl acetate (MPA), isopropanol (IPA), ethyl isobutyrate (EIB), ketones, aromatic hydrocarbons, amines, nitrated hydrocarbons, chlorinated hydrocarbons, or combinations thereof. In one aspect, which is combinable with any of the other aspects or embodiments, the solvent is non-polar with a dielectric constant at 20° C. of less than 20.

In one aspect, which is combinable with any of the other aspects or embodiments, the lithium-based compound comprises at least one of lithium cobaltite (LCO), lithium manganite spinel (LMO), lithium nickel cobalt aluminate (NCA), lithium nickel manganese cobalt oxide (NMC), lithium iron phosphate (LFP), lithium cobalt phosphate (LCP), lithium titanate, lithium niobium tungstate, lithium titanium sulfide, or combinations thereof. In one aspect, which is combinable with any of the other aspects or embodiments, the lithium-, sodium-, or magnesium-based compound is at least 50 wt. % of the total slurry precursor. In one aspect, which is combinable with any of the other aspects or embodiments, the sodium- or magnesium-based compound comprises: at least one of NaVPO$_4$F, NaMnO$_2$, Na$_{2/3}$Mn$_{1-y}$Mg$_y$O$_2$ (0<y<1), Na$_2$Li$_2$Ti$_5$O$_{12}$, Na$_2$Ti$_3$O$_7$, MgCr$_2$O$_4$, or MgMn$_2$O$_4$.

In one aspect, which is combinable with any of the other aspects or embodiments, the slurry precursor further comprises at least one of binder and plasticizer.

In one aspect, which is combinable with any of the other aspects or embodiments, wherein the tape casting comprises: forming the slurry precursor to a sheet configuration having a thickness in a range of 5 µm to 100 µm; and drying the sheet configuration such that a combination of the at least one solvent, dispersant, and plasticizer does not exceed 10 wt. % of the dried sheet. In one aspect, which is combinable with any of the other aspects or embodiments, the method further comprises: debinding the dried sheet at a predetermined temperature. In one aspect, which is combinable with any of the other aspects or embodiments, the predetermined temperature is in a range of 175° C. to 350° C. In one aspect, which is combinable with any of the other aspects or embodiments, the step of debinding and the step of sintering is conducted simultaneously. In one aspect, which is combinable with any of the other aspects or embodiments, the method further comprises: pyrolyzing organics in the dried sheet at a temperature in a range of 175° C. to 350° C.

In one aspect, which is combinable with any of the other aspects or embodiments, the sintering is conducted for a time in a range of less than 45 min and comprises continually feeding the green tape through a sintering chamber at a predetermined rate measured in in/min. In one aspect, which is combinable with any of the other aspects or embodiments, a final thickness of the sintered composition is in a range of 2 µm to 100 µm immediately after the sintering without further processing. In one aspect, which is combinable with any of the other aspects or embodiments, the method further comprises: continuous tape casting the sintered composition.

In some embodiments, an energy device, comprises: a first sintered, non-polished electrode having a first surface and a second surface; a first current collector disposed on the first surface of the first electrode; an electrolyte layer disposed on the second surface of the first electrode; a second electrode disposed on the electrolyte layer; and a second current collector is disposed on the second electrode. In one aspect, which is combinable with any of the other aspects or embodiments, the first electrode comprises the sintered composition described herein. In one aspect, which is combinable with any of the other aspects or embodiments, the electrolyte layer has a conductivity of at least $10^{-6}$ S/cm. In one aspect, which is combinable with any of the other aspects or embodiments, first electrode is a substrate of the energy device.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and the operation of the various embodiments.

FIGS. 6A and 6B illustrate particle size distribution curves (FIG. 6A) and D10/D50/D90 particle sizes of LCO dispersed by fish oil (FO), oleylamine (OAM), oleic acid (OA), and combinations of OA with OAM in MPA solvent, according to some embodiments.

FIGS. 7A and 7B illustrate particle size distribution curves (FIG. 7A) and D10/D50/D90 particle sizes of LCO dispersed by fish oil (FO), dibutylamine (DBA), oleic acid (OA), and combinations of OA with DBA in MPA solvent, according to some embodiments.

FIGS. 8A and 8B illustrate particle size distribution curves (FIG. 8A) and D10/D50/D90 particle sizes of LCO dispersed by fish oil (FO), oleylamine (OAM), oleic acid (OA), and combinations of OA with OAM in IPA solvent, according to some embodiments.

FIGS. 9A and 9B illustrate particle size distribution curves (FIG. 9A) and D10/D50/D90 particle sizes of LCO dispersed by fish oil (FO), dibutylamine (DBA), oleic acid (OA), and combinations of OA with DBA in IPA solvent, according to some embodiments.

FIGS. 10A and 10B illustrate pictures of dewetting of slip compositions from Table 2 (FIG. 10A) and Table 3 (FIG. 10B) prepared using MPA as a solvent and cast on a Mylar film, according to some embodiments.

FIGS. 11A and 11B illustrate pictures of improvements to dewetting solved by using ethyl isobutyrate (EIB) as the solvent instead of MPA to cast slip compositions from Table 2 (FIG. 11A) and Table 3 (FIG. 11B) on a Mylar film, according to some embodiments.

FIGS. 14A-14C illustrate images of LCO green tape prepared with a slip composition comprising EIB solvent and OAM dispersant (FIG. 14A); the residual of the LCO green tape ignited at binder burnout (BBO) processing when the LCO green tape was pulled into a tube furnace at 2.3 in/min speed (FIG. 14B); and a successfully sintered LCO tape after the LCO green tape was pulled into a tube furnace at 1.6 in/min speed and sintered at 1050° C. (FIG. 14C), according to some embodiments.

FIGS. 15A and 15B illustrate scanning electron microscopy (SEM) cross-section (FIG. 15A) and top view (FIG. 15B) images of LCO tape sintered at 1050° C., according to some embodiments.

DETAILED DESCRIPTION

Figure 1:
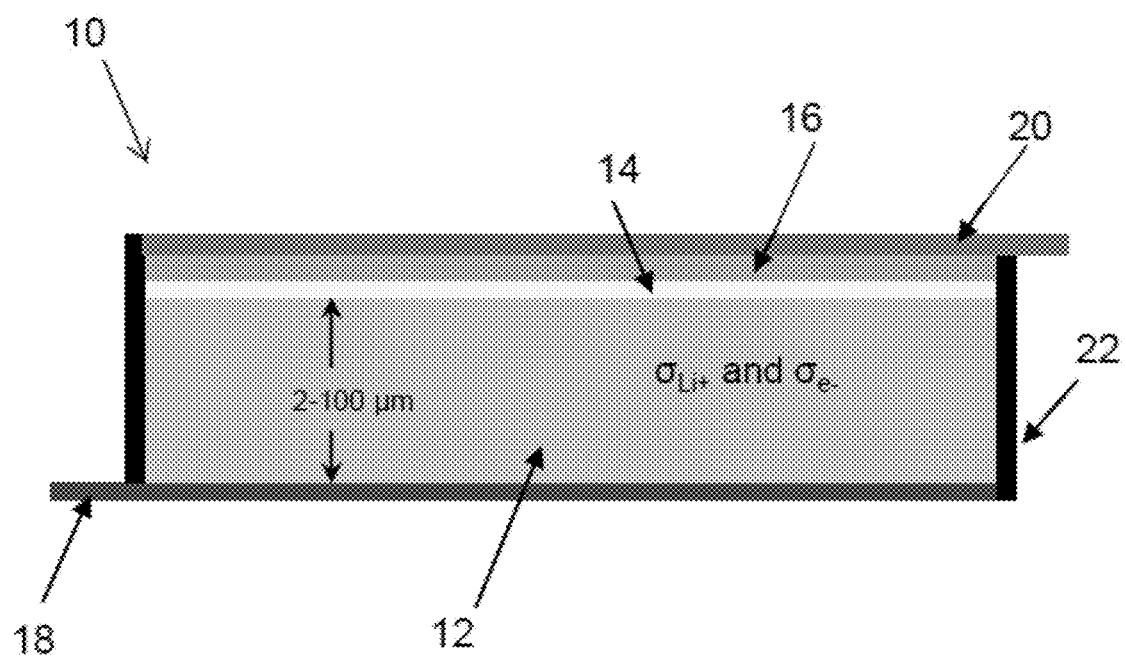
FIG. 1 illustrates a lithium-ion battery described herein, according to some embodiments.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments. It should be understood that the present application is not limited to the details or methodology set forth in the description or illustrated in the figures. It should also be understood that the terminology is for the purpose of description only and should not be regarded as limiting.

Additionally, any examples set forth in this specification are illustrative, but not limiting, and merely set forth some of the many possible embodiments of the claimed invention. Other suitable modifications and adaptations of the variety of conditions and parameters normally encountered in the field, and which would be apparent to those skilled in the art, are within the spirit and scope of the disclosure.

Recently, there has been increased activity in understanding how to increase energy density of batteries, for example, to reduce time intervals between charges, freeing space on the devices for other functionality, and in reducing weight where mobility is critical. In addition, higher energy density often leads to lower costs since fewer materials are consumed in manufacturing processes. The majority of attention has been focused on lithium-based batteries, and efforts can be broadly separated into two categories.

In one approach that is largely compatible with existing lithium battery manufacturing technology, advanced cathode materials with higher capacity like NMC 811 and NCA are being developed (either alone or in conjunction with surface coatings) or, increasing quantities of silicon may be added to the battery anode. In a second approach, technologies are aimed at enabling lithium metal anodes. This approach involves solid electrolytes such as lithium garnet, lithium phosophosilicate, and LiPON.

The present disclosure relates to new formulation designs for continuously casting and sintering LCO tape. Dispersant, binder, plasticizer and solvent are four key components besides solid powder in slip formulations. Dispersant impacts tape casting process and green tape quality. Binder and plasticizer impact tape strength, flexibility, releasability, and ability to be assembled from stacks of tapes by pressing. Solvent impacts green tape dry speed and rollability during continuous casting.

Specifically, the present application discloses novel dispersants in slip formulations for LCO tape that facilitate better dispersing of LCO powder. The role of dispersants in tape casting is very important because it is central to dispersion, wetting, high density, porosity, deflouculation, slip stability, and green tape strength. It is also a starting point for tape casting with fine powder. After solvent evaporates, the dispersant permits the particles to settle into a densely packed green tape. Therefore, an effective dispersant can increase the density and strength of the green tape.

Dispersants disclosed herein include amine molecules or a combination of amine with carboxylic acid. Amines or the combination of amines with carboxylic acid as dispersants improve LCO dispersion to obtain stable slips for tape casting. In some embodiments, the amine compound may comprise at least one amino and/or imino groups with either containing alkyl chains or aromatic rings, wherein the number of carbons in the structure is less than 30. In some embodiments, the carboxylic acid compound may comprise R—COOH structured molecules, where R is an alkyl chain or aromatic ring and the number of carbons in the structure is less 30.

Figure 5:
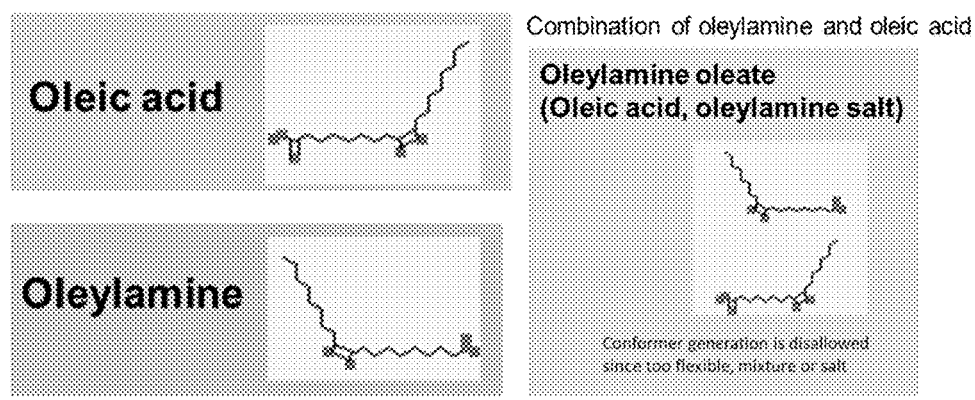
FIG. 5 illustrates one example of dispersant used in LCO slip formulation for tape casting: amine (oleylamine), carboxylic acid (oleic acid), and the combination structure thereof, according to some embodiments.

FIG. 5 illustrates one example of dispersant used in LCO slip formulation for tape casting: amine (oleylamine), carboxylic acid (oleic acid), and the combination structure thereof, according to some embodiments. The combination of amine (oleylamine) with carboxylic acid (oleic acid) does not form a compound having a particular molecular conformation. In other words, the combination may be a mixture or salt depending on the ratio of acid-to-amine and the interaction with other components in the slip. Selection of the combination ratio, chain length, and structure of organic acid and amine is dependent on other slip components, such as the solvent and binder, because surfactant (i.e., dispersant) behavior is dependent on the hydrophilic-lipophilic balance (HLB) value, interaction between each component, and pH preference of binder. HLB is a measure of the degree to which a compound is hydrophilic or lipophilic, determined by calculating HLB values for different regions of the molecule used in application. A good dispersant/surfactant has compatible HLB values as the solvent and/or binder. Short alkyl chains exhibit weak hydrophobic interactions. With respect to pH preference, some powders or binders work well in slightly acid conditions, while other powders or binders work better in basic conditions. Because amines are basic molecules and carboxylic acids are acid molecules, the ratio of amine:carboxylic may be variable in order to provide a comfortable pH environment for powders and binders.

Other dispersants for tape casting of ceramic powders may include fatty acids, esters, phosphate ester and terpineol. Yet other dispersants for tape casting of ceramic powders may include polymers, such as polyethylene glycol (PEG), polyvinyl butyral (PVB), and polyvinyl pyrrolidone (PVP).

Binders and plasticizers provide crosslinks and improve tensile strength to ceramic green bodies. As stated above, dispersant characteristics (e.g., combination ratio, chain length, and structure of organic acid and amine) depends on appropriate selection of the binder. Binders which function well with the dispersants disclosed herein include polyvinyl butyral (PVB), polyacrylic acid, and polypropylene carbonates, such as QPAC 25 and QPAC 40. These binders may include hydroxyl or carbonyl functional groups, which provide sites for attaching dispersants. Dispersants disclosed herein are organic molecules, so they have smaller steric hinderance and better controllable orientation than commercial polymer dispersants for interacting with binders. The interaction between binders and dispersants disclosed here help prevent dangling ends of binders to form entangled networks and bridging flocculation, which can lead to gravitational settling of ceramic particle clusters, increasing the viscosity of the slip, and castings with an inhomogeneous distribution of particles.

Plasticizers which function well with the dispersants disclosed herein include dibutyl phthalate, non-phthalate plasticizer Santicizer® Platinum P-1400, polyhydric alcohols, acetate esters, glycerides, castor oils, and mineral oils. As stated above with regard to binders, these plasticizers have hydroxyl or carbonyl functional groups that can provide sites to interact with the dispersant and form homogenous and stable slips for casting.

Solvent selection is dependent on the desired properties of the carrier film (i.e., film formed from casting the slip composition) and desired vapor pressure for drying speed. Solvents may include propylene oxide-based glycol ether acetate, esters, alcohols, and hydrocarbons. In some embodiments, the solvent comprises 1-methoxy-2-propanyl acetate (MPA), isopropanol (IPA), ethyl isobutyrate (EIB), ketones, aromatic hydrocarbons, amines, nitrated hydrocarbons, chlorinated hydrocarbons, or combinations thereof.

As stated above, the present disclosure relates to new formulation designs for continuously casting and sintering LCO tape for electrodes in LIB applications.

Sintered cathodes enable higher energy density by more efficiently utilizing available space. For example, the sintered cathode increases energy density by serving as a mechanical support. Typically, aluminum supports may be used as mechanical supports for the battery structure. A thickness of aluminum supports of only about 0.5 µm to 1.0 µm is sufficient for current distribution and collection. It is usually applied to one side of the cathode support by metal evaporation or other industrialized thin-film deposition process. The energy density of a sintered cathode like LCO as disclosed herein (i.e., without the need for aluminum supports), would increase by ~50% by volume and about 27% by weight for porous structures, and ~80% by volume and about 37% by weight for dense structures for solid-state batteries. When compared to conventionally prepared cathodes, sintered cathodes may eliminate the mass and volume of organic binder and conductive carbon.

Referring generally to the figures, various embodiments of a sintered electrode that includes at least one alkali metal or alkaline earth metal are disclosed. The sintered electrode has a thickness of 2 µm to 150 µm and a cross-sectional area of at least 3 $cm^2$. Compared to conventional electrode materials, the sintered electrode can be made much larger and self-supporting than typical thin-film formed electrodes and is usable without any additional finishing techniques, such as grinding or polishing, in contrast to other sintered electrodes. The disclosed sintered electrodes are able to achieve these advantages through a tape manufacturing process that allows for must faster manufacturing speeds of "medium" thickness electrode materials in which processing speed is independent of electrode thickness. That is, the electrodes can be made thicker than conventional electrodes made through thin film techniques and thinner than other sintered electrodes that have to be ground down to usable sizes. Moreover, the electrode can be rapidly sintered in a more economical process than is currently used for manufacturing electrode materials. Indeed, conventional processes typically utilize thin film techniques that are much slower and more difficult to build up thick layers. In this way, the relatively thicker sintered electrodes of the present disclose not only eliminate inactive components, such as mechanical supports, but also increase the charge capacity of the battery. Moreover, the thickness of the electrode and tape-casting manufacturing process allow for electrode materials to be manufactured in a roll-to-roll format.

The sintered electrodes disclosed herein are envisioned to be suitable for a variety of battery chemistries, including lithium-ion, sodium-ion, and magnesium-ion batteries as well those using solid state or liquid electrolyte. Various embodiments of the sintered electrode, manufacturing process, and lithium-ion batteries are disclosed herein. Such embodiments are provided by way of example and not by way of limitation.

As mentioned, various embodiments of a sintered electrode comprise at least one of an alkali metal or alkaline earth metal. In other embodiments, the sintered electrode may be a fluoride compound. In embodiments, the sintered electrode includes at least one of lithium, sodium, or magnesium. In embodiments, the sintered electrode also includes at least one transition metal, such as cobalt, manganese, nickel, niobium, tantalum, vanadium, titanium, copper, chromium, tungsten, molybdenum, tin, germanium, antimony, bismuth, or iron.

Exemplary embodiments of a lithium-based electrode include lithium cobaltite (LCO), lithium manganite spinel (LMO), lithium nickel cobalt aluminate (NCA), lithium nickel manganese cobalt oxide (NMC), lithium iron phosphate (LFP), lithium cobalt phosphate (LCP), lithium titanate, lithium niobium tungstate, lithium nickel manganate, and lithium titanium sulfide ($LiTiS_2$), among others. Exemplary embodiments of a sodium-based electrode include $NaVPO_4F$, $NaMnO_2$, $Na_{2/3}Mn_{1-y}Mg_yO_2$ ($0<y<1$), $Na_2Li_2Ti_5O_{12}$, or $Na_2Ti_3O_7$, among others. Exemplary embodiments of a magnesium-based include magnesiochromite ($MgCr_2O_4$) and $MgMn_2O_4$, among others.

In embodiments, the sintered electrode includes a first phase, and at least one other phase (e.g., a second phase, a third phase, a fourth phase, etc.) intermixed with the first phase. In embodiments, the additional phase or phases are selected to provide additional functionality. For example, in an embodiment involving a lithium electrode, a second phase enhances the effective lithium conductivity of the electrode, for example a lithium garnet phase. In an embodiment, the second phase enhances electronic conductivity. The additional phase or phases can be added prior to sintering, or the sintered electrode may contain open porosity that may be infiltrated with the additional phase or phases. In embodiments, the second phase is a spinel that provides additional electronic conductivity.

Increased electronic conductivity has benefits to cell performance battery making processes. For example, increased conductivity reduces internal resistance of a battery, thereby enabling faster charging and delivery of greater power. Increased conductivity also allows thicker electrodes to be utilized, which are advantageous for cathode fabrication and battery assembly. Battery capacity is controlled by mass of active electrode material. In contrast, rates of sheet making process are dictated by area. In other words, the same amount of area can be made regardless of the thickness of the sheet. Hence, a given capacity of cathode can be made in less time if it is thicker. Use of a thinner cathode for rate performance implies assembly of more layers of single cells to build a battery of a given capacity. The number of assembly steps to make a battery with thicker cathodes can be reduced, leading to lower cost.

In some embodiments, the sintered electrode includes a first phase and trace, non-significant, quantities of a second phase.

One advantage of the sintered electrodes disclosed herein is that they can be made larger than conventional electrode materials for batteries, such as those made using thin-film techniques. In embodiments, the sintered electrode has a thickness of from 2 µm to 150 µm, or from 5 µm to 150 µm, or from 20 µm to 80 µm, or from 30 µm to 60 µm, or any value or sub-range disclosed therein. Besides being thicker than thin-film electrodes, the sintered electrode can also be made with a relatively larger cross-sectional area. In embodiments, the sintered electrode has a cross-sectional area of at least 3 $cm^2$, or at least 10 $cm^2$, or at least 100 $cm^2$, or up to 1 $m^2$, or any value or sub-range disclosed therein.

The sintered electrode is able to be made larger than conventional thin-film electrodes because the electrode is formed from a tape cast or extruded green tape that is rapidly sintered. In order to form the green tape, a slurry (or paste) is prepared from a powder component, a binder, and a solvent. The powder component includes a powdered compound or powdered compounds containing a lithium-, sodium-, or magnesium-based compound and at least one alkali metal or alkaline earth metal. The powdered compounds containing the lithium-, sodium-, or magnesium-based compound and the alkali metal or alkaline earth metal may be a single powdered compound. Alternatively or additionally, the compounds can include a lithium-, sodium-, or magnesium-based compound and a separate compound containing an alkali metal or alkaline earth metal. Further, in embodiments, the powdered compound can further contain a transition metal along with or in a separate compound from the lithium-, sodium-, or magnesium-based compound and the compound containing an alkali metal or alkaline earth metal.

For example, with respect to a lithium electrode, the powdered compound may comprise lithium and a transition metal, such as LCO or LMO. In another example, one compound can contain the lithium compound and the compound containing an alkali metal or alkaline earth metal, and another compound can contain a transition metal. For example, with respect to a lithium electrode, the lithium compound can be at least one of $Li_2O$, $Li_2CO_3$, $LiOH$, $LiNO_3$, lithium acetate ($CH_3COOLi$), or lithium citrate ($Li_3C_6H_5O_7$), among others, and the transition metal-containing compound can be at least one of $MnO_2$, $Mn_2O_3$, $Co_2O_3$, $CoO$, $NiO$, $Ni_2O_3$, $Fe_2O_3$, $Fe_3O_4$, $FeO$, $TiO_2$, $Nb_2O_5$, $V_2O_5$, $VO_2$, $Ta_2O_5$, or $WO_3$. In embodiments, the powder component of the slurry or paste (including all powdered compounds) comprises from 40% to 75% by weight of the slurry (or paste). In other embodiments, the powder component comprises from 45% to 60% by weight of the slurry (or paste), and in still other embodiments, the powder component comprises from 50% to 55% by weight of the slurry (or paste).

The slurry (or paste) is provided with a binder that holds the powder component together in the form of the green tape prior to sintering. In embodiments, the binder is at least one of polyvinyl butyral (PVB) (e.g., Butvar® PVB resins, available from Eastman Chemical Company; etc.), acrylic polymers (e.g., Elvacite® acrylic resins, available from Lucite International; polyacrylic acid; etc.), polyvinyl alcohol, among others.

The slurry (or paste) is also provided with a solvent in which the powder component and binder are dispersed. Solvent selection is dependent on the desired properties of the carrier film (i.e., film formed from casting the slip composition) and desired vapor pressure for drying speed.

The solvent may also be selected to avoid leaching the alkali metal or alkali earth metal from the lithium-, sodium-, or magnesium-based compounds in the slurry. Such leaching can occur as the result of ion exchange or the formation of hydroxides. Once the alkali metal or alkali earth metal enters the solvent, there can be several unwanted side-effects. For example, solubility of the binder may be reduced; or the dissolved metal may interfere with dispersants; or the dissolved metal may migrate during drying, leading to chemical inhomogeneity in the dried tape; or chemistry of the inorganic particles themselves may become altered. Moreover, reaction with the solvent is time dependent so the slip properties are subject to continuous change and a potentially unstable process.

Solvents may include propylene oxide-based glycol ether acetate, esters, alcohols, hydrocarbons, 1-methoxy-2-propanyl acetate (MPA), ethanol-butanol mixtures, or combinations thereof. In some embodiments, the solvent comprises 1-methoxy-2-propanyl acetate (MPA), isopropanol (IPA), ethyl isobutyrate (EIB), ketones, aromatic hydrocarbons, amines, nitrated hydrocarbons, or chlorinated hydrocarbons, or combinations thereof.

Accordingly, in embodiments, the solvent is selected to be non-polar. In particular embodiments, the non-polar solvent has a dielectric constant at 20° C. of less than 20. In other embodiments, the non-polar solvent has as dielectric constant at 20° C. of less than 10, and in still other embodiments, the non-polar solvent has a dielectric constant at 20° C. of less than 5. Further, in embodiments, the solvent leaches less than 1 ng/L of the alkali metal or alkaline earth metal from the powder component in the slurry. In other embodiments, the solvent leaches less than 0.1 ng/L of the alkali metal or alkaline earth metal from the powder component in the slurry, and in still other embodiments, the solvent leaches less than 0.01 ng/L of the alkali metal or alkaline earth metal from the powder component in the slurry.

In some embodiments, the chemistry of the binder may be adjusted to work with non-polar solvents, such as MPA. For example, Butvar® B-79 is a commercially available PVB that has a low concentration of hydroxyl groups from polyvinyl alcohol (11-13% by weight) and, compared to other PVB binders, has a low molecular weight. This allows for ease of dissolution and high solubility to control viscosity and enable a high loading of solids.

In embodiments, that slurry (or paste) may contain other additives that aid in processing. For example, in embodiments, the slurry (or paste) may contain between 0.1% to 5% by weight of a dispersant and/or of a plasticizer. With respect to the dispersant, as stated above, novel dispersants are disclosed in slip formulations for LCO tape that facilitate better dispersing of LCO powder. Dispersants in tape casting is central to dispersion, wetting, high density, porosity, defloucculation, slip stability, and green tape strength. After solvent evaporates, the dispersant permits the particles to settle into a densely packed green tape. Therefore, an effective dispersant can increase the density and strength of the green tape.

Dispersants disclosed herein include amine molecules or a combination of amine with carboxylic acid. As provided above, amines or the combination of amines with carboxylic acid as dispersants improve LCO dispersion to obtain stable slips for tape casting. In some embodiments, the amine compound may comprise at least one amino and/or imino groups with either containing alkyl chains or aromatic rings, wherein the number of carbons in the structure is less than 30. In some embodiments, the carboxylic acid compound may comprise R—COOH structured molecules, where R is an alkyl chain or aromatic ring and the number of carbons in the structure is less 30. Amines or the combination of amines with carboxylic acid as dispersants improve LCO dispersion to obtain stable slips for tape casting. Other dispersants for tape casting of ceramic powders may include fatty acids, esters, phosphate ester, terpineol, and fish-oil. Yet other dispersants for tape casting of ceramic powders may include polymers, such as polyethylene glycol (PEG), polyvinyl butyral (PVB), and polyvinyl pyrrolidone (PVP).

With respect to plasticizers which function well with the dispersants disclosed herein, these include dibutyl phthalate and non-phthalate plasticizer Santicizer® Platinum P-1400, polyhydric alcohols, acetate esters, glycerides, castor oils, and mineral oils.

Further, as will be discussed more fully below, the presence of transition metal oxides in the slurry (or paste) can cause a catalytic combustion reaction during sintering. Thus, in embodiments, the slurry (or paste) may contain additives to prevent or reduce the severity of such combustion reactions. In particular, the slurry (or paste) may contain an antioxidant, such as a phenol (e.g., butylated hydroxytoluene (BHT) or alkylated-diphenylamine), or materials with an endothermic decomposition like inorganic carbonates and hydroxides.

Processing

The slurry (or paste) is tape cast or extruded into a green tape having the desired thickness of the sintered electrode. As discussed above, the thickness may be in the range of from 2 μm to 150 μm. In embodiments, the green tape is dried to remove a substantial portion of the solvent, leaving primarily the lithium-, sodium-, or magnesium-based compound containing the alkali metal or alkaline earth metal. In embodiments, drying may occur at ambient temperature or at a slightly elevated temperature of 60° C. to 80° C. (or begin at an ambient temperature and transition to an elevated temperature). Additionally, in embodiments, air is circulated to enhance drying. In embodiments, the amount of organic material remaining after drying is no more than 10% by weight of the dried green tape. Upon drying the green tape is debound and sintered. That is, the green tape is heated to a temperature at which the polymer binder and any other organics are burned off. In embodiments, debinding occurs in the temperature range of 175° C. to 350° C. Thereafter, the dried and debound green tape is sintered. Sintering occurs in the temperature range of 500° C. to 1350° C. Sintering time in this temperature range is less than 60 minutes. In embodiments, sintering time is less than 50 minutes, and in still other embodiments, sintering time is less than 45 minutes. Upon sintering, the sintered electrode has a porosity of no more than 30%. In embodiments, the sintered electrode tape has a porosity of no more than 25%. In other embodiments, the sintered electrode has a porosity of no more than 20%, and in still other embodiments, the sintered electrode has a porosity of no more than 15%. In embodiments, the porosity of the sintered electrode is at least 0.1%. As a result of the sintering process, in embodiments, the sintered electrode has on average a grain size of from 10 nm to 50 µm. In other embodiments, the grain size on average is from 50 nm to 10 µm, and in still other embodiments, the grain size on average is from 100 nm to 1000 nm.

Further, in embodiments, the sintered electrode has an open porosity such that fluid communication is provided between a first surface of the sintered electrode to the other surface. That is, in embodiments, the lithium-, sodium-, or magnesium-based compound phase comprises a solid phase, and the porosity comprises a second phase in which the second phase is a continuous phase in the solid phase. Additionally, in embodiments, the pores of the sintered electrode tape are substantially aligned to promote ion transport. That is, the pores are aligned along an axis perpendicular to the first and second surfaces. For example, each pore may have a cross-sectional dimension that is longer than any other cross-sectional dimension of the pore, and the longer cross-section dimension is substantially aligned perpendicularly to the first and second surfaces of the electrode, e.g., on average, aligned to within 250 of perpendicular. Advantageously, in contrast to other sintered electrodes, the sintering process described produces a sintered electrode that requires no further finishing, such as mechanical grinding or polishing, prior to incorporating into a battery architecture. In particular, previous sintered electrodes were formed from large discs at much greater thicknesses, e.g., 500 µm to 1 mm, and had to be diced to usable dimensions and ground down to a usable thickness. Such grinding has reportedly only been able to achieve a thickness of about 130 µm, which is the practical limit for electrodes manufactured according to such processes. By tape-casting the electrode, not only is the process made more economical (e.g., no grinding/polishing steps and ability to utilize roll-to-roll fabrication), but also desirable thicknesses of the electrode material can be achieved.

Further, because the sintered electrode is self-supporting, the sintered electrode can be used as a substrate for deposition of additional layers. For example, a metallic layer (e.g., up to 5 µm) can be deposited onto a surface of the sintered electrode to serve as a current collector for a battery. Additionally, in an exemplary embodiment, a solid electrolyte, such as lithium-phosphorous-oxynitride (LiPON), lithium garnet (e.g., garnet LLZO ($Li_7La_3Zr_2O_{12}$)), or lithium phosphosulfide, may be deposited by RF-sputtering onto the sintered electrode. Alternatively, a thin layer of LiPON solid electrolyte can be applied through ammonolysis of a thin layer of $Li_3PO_4$ or $LiPO_3$ or through reactive sintering. Such processes are envisioned to be faster and potentially less capital intensive than conventional deposition techniques for solid electrolytes. Similarly, a solid electrolyte of lithium garnet (e.g., LLZO) can be applied by sol-gel, direct sintering, and reactive sintering.

Further, as a self-supporting layer, the sintered electrode can provide the basis for an advantaged manufacturing approach for lithium batteries that use a liquid electrolyte. In other words, the cathode (i.e., sintered electrode) is a substrate of the battery. In particular, the sintered electrode can be made in a continuous process and used as a substrate for coating in either batch or roll-to-roll processing. Such processing could allow, for example, metallization of the sintered electrode by sputtering and/or electrolytic deposition to form a metallized sintered electrode. In this way, the thickness of the electrode current collector metal can for a conventional lithium battery can be reduced from the typical thickness of 10-15 µm to less than 5 µm, less than 1 µm, or even less than 100 nm. Further, the metallized sintered electrode can be supplied in piece or roll form as a stand-alone component to a battery cell manufacturer. Advantageously, such metallized sintered electrodes reduce the volume of the cell typically reserved for the current collector, allowing for more active electrode material and higher capacity.

In this regard, the sintered electrode is particularly suitable for use in ion intercalation type batteries. An exemplary embodiment of a lithium-ion battery 10 is shown in FIG. 1. The lithium-ion battery 10 includes a sintered cathode 12, an electrolyte layer or region 14, and an anode 16. In embodiments, the sintered cathode 12 has a thickness of from 2 µm to 150 µm. Additionally, in embodiments, the sintered cathode 12 has a cross-sectional area of at least 3 $cm^2$. Advantageously, the sintered cathode 12 mechanically supports the lithium-ion battery 10 such that the sintered cathode 12 is not carried on a mechanical support, such as a zirconia support. The advantage of this architecture is that inactive components are substantially excluded from the battery. That is, while providing the function of a mechanical support, the sintered cathode 12 is still an active component and contributes to the capacity of the battery. Accordingly, the cathode-supported design can give the same overall capacity in a thinner form-factor, or the thickness of the cathode can be increased for a higher net capacity at the same size.

Further, the sintered cathode 12 can be used in both solid-state and liquid electrolyte lithium-ion batteries. In particular, in a solid-state battery, the electrolyte layer 14 includes a solid-state electrolyte (e.g., having a conductivity of $>10^{-6}$ S/cm), such as LiPON, lithium garnet (e.g., LLZO), or lithium phosphosulfide. More particularly, in a solid-state battery, the electrolyte layer 14 includes a solid electrolyte, such as LiPON, lithium garnet (e.g., LLZO), lithium phosphosulfide, or lithium super ionic conductor (LISICON), with a combination of lithium ion conductivity and thickness such that the area specific resistance is less than about 100 $\Omega cm^2$. One advantage of LiPON, in particular, is that it is resistant to dendrite formation. In a liquid electrolyte battery, the electrolyte layer 14 includes a liquid electrolyte, such as $LiPF_6$-DMC (lithium hexafluorophasophate in dimethyl carbonate), and a polymer or ceramic separator to separate the cathode 12 and anode 16. In either case, the sintered cathode 12 increases the charge capacity over conventional lithium-ion batteries.

The battery 10 also includes a first current collector 18 disposed on a first surface of the sintered cathode 12. In the embodiment depicted, a second current collector 20 is disposed on the anode 16; however, in embodiments, the anode may be a metal (such as lithium metal or magnesium metal) in which case a current collector may be excluded. Further, in the embodiment depicted, the battery 10 is encased in a protective coating 22. In embodiments, the first current collector 18 is copper, and the second current collector 20 (when used) is aluminum. The protective coating 22 may be, e.g., parylene.

While the depicted embodiment only includes a sintered cathode 12, the anode 16 may also be a sintered electrode according to the present disclosure. For a lithium-ion battery, the (sintered) cathode 12 may include at least one of lithium cobaltite, lithium manganite spinel, lithium nickel cobalt aluminate, lithium nickel manganese cobalt oxide, lithium iron phosphate, lithium cobalt phosphate, lithium nickel manganate, or lithium titanium sulfide, and the (sintered) anode 16 may include at least one of lithium titanate or lithium niobium tungstate.

Additionally, while a lithium-ion battery is depicted, the battery could instead be based on sodium-ion, calcium-ion, or magnesium-ion chemistries. For a sodium-ion battery, the (sintered) cathode 12 may include at least one of $NaMnO_2$, $Na_{2/3}Mn_{1-y}Mg_yO_2$ (0<y<1), or $NaVPO_4F$, and the (sintered) anode 16 may include at least one of $Na_2Li_2Ti_5O_{12}$ or $Na_2Ti_3O_7$. For a magnesium-ion battery, the (sintered) cathode 12 may include at least one of $MgCr_2O_4$ or $MgMn_2O_4$, and the anode 16 may magnesium metal (which could also serve as the current collector 20). Any of the foregoing battery chemistries may utilize a liquid electrolyte comprising a solvent (e.g., DMC) and a salt with a cation matching the intercalant ion. Additionally, for a sodium-ion battery, sodium super ionic conductor (NASICON) may be used as a solid-state electrolyte.

Figure 2:
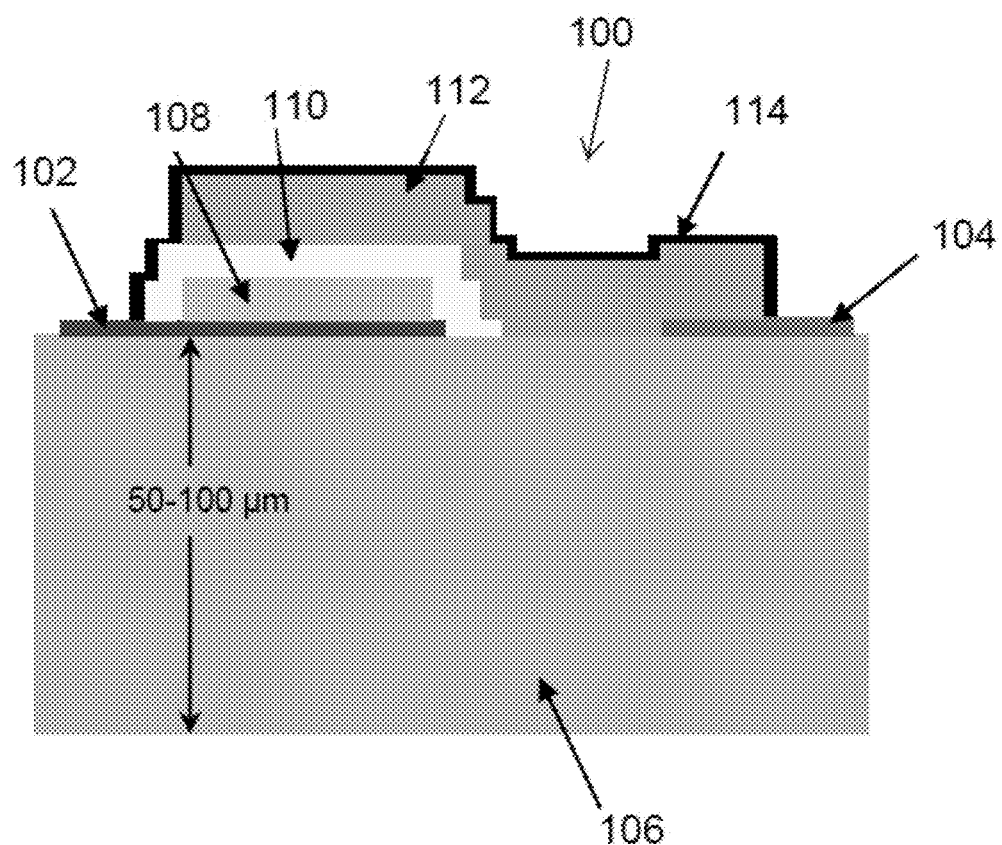
FIG. 2 illustrates a schematic cross-section of a conventional solid-state, thin-film micro-battery, according to some embodiments.

For the purposes of demonstrating the gain in capacity, FIG. 2 provides a schematic cross-section of a conventional solid-state, thin-film micro-battery 100. The micro-battery 100 includes a cathode current collector 102 and an anode current collector 104 deposited onto an inert mechanical support 106. A cathode 108 (e.g., LCO or LMO) is formed onto the cathode current collector 102 and is surrounded by a solid-state electrolyte 110 (e.g., LiPON). An anode 112 is deposited over the electrolyte 110 and over the anode current collector 104. A coating 114 is provided to protect the cathode 108, electrolyte 110, and anode 112. In the conventional battery design, the mechanical support 106 is relied upon for handling during fabrication of the battery 100 and is the platform for the deposition of the cathode 108 and electrolyte 110 layers. The mechanical support 106 typically has a thickness of 50 μm to 100 μm. The mechanical support 106 and the protective coating 114 also provide rigidity in the final package and help prevent damage.

In these conventional batteries 100, the cathode 108 is typically grown to desired thickness by processes such as RF sputtering or pulsed laser deposition. These deposition techniques are another reason why the conventional battery 100 requires the use of mechanical support 106. Such conventional methods produce cathode materials at a rate of <10 μm/hr, which creates a practical and commercial limit to the achievable thicknesses of these conventional cathode materials. As a consequence, thin film micro-batteries have only found applications where small size power sources are needed like smart cards, medical implants, RFID tags, and wireless sensing.

A comparison of the charge capacity of battery 10 of FIG. 1 according to the present disclosure and the charge capacity conventional battery 100 of FIG. 2 is made at nominally identical thicknesses of 80 μm. In particular, the comparison is made between (1) a conventional battery 100 having a 50 μm thick mechanical support 106 of zirconia and a cathode that is 5 μm thick and (2) the presently disclosed battery 10 having a cathode 12 that is 35 μm thick. Notably, the thickness of the cathode 12 of the presently disclosed battery 10 is less than the thickness of the mechanical support 106 of the conventional battery 100, allowing space to be reserved for lithium metal at the anode 16. The extra thickness of the sintered cathode 12 and removal of the mechanical support 106 provides a seven-fold higher capacity in absolute and volumetric terms, and the capacity is ten-fold greater on a weight basis.

Besides simply allowing for a larger electrode, the sintered cathode 12 of the depicted embodiment also provides structural advantages that increase its charge capacity over conventional cathodes. In a conventional cathode 108, the active cathode particles make point contacts. The cross-sectional areas of the contacts are small and so have a high impedance to movement of lithium ions and electrons. In order to overcome this impedance issue, carbon is added to the electrode as a conductive pathway to facilitate transport of electrons into and out of the active particles, and pore space in the electrodes are infiltrated with liquid electrolyte for fast conduction of lithium ions. The use of carbon in this manner creates a tradeoff between capacity of the batter and charge/charge rate performance. The other issue with the point contacts between the active cathode particles is that they are weak, and so polyvinyl fluoride (PVF) is used to bind the active particles and carbon together to give the structure strength during processing. In contrast, particles in the depicted sintered cathode 12 are bonded to one another, and so, the electronically conductive carbon and binder may be eliminated. In this way, the proportion of space allocated to porosity for movement of lithium ions may be reduced, and more space can be dedicated to active material with a sintered cathode. The inventors estimate that for a given cathode material, the capacity in aggregate can be raised by approximately 30% on the basis of equal cathode thicknesses. Alternatively, the cathode thickness could be reduced by 20-25% while keeping the capacity the same for a more compact battery. As mentioned above, the pores in the sintered cathode 12 can be aligned in the direction of transport of ions to and from the anode so as to enable further improvements in space utilization or to boost power density.

As used herein, the phrase "self-supporting" refers to a structure that is not adhered or supported by an underlying substrate (i.e., inert mechanical support). In some examples, self-supporting sintered electrodes are free-standing, which can be mechanically manipulated or moved without need of a substrate adhered or fixed thereto and which can itself be used as a substrate for deposition of additional layers. Thus, for the embodiments described herein, a self-supporting sintered electrode serves a dual function of being a support upon which additional energy storage elements (e.g., electrolyte layer, current collector, etc.) may be disposed and being an active component (e.g., cathode or anode) of the battery. As used herein, the phrase "cross-sectional area" refers to a cathode surface area that may be used to support construction of a battery structure. For example, with reference to FIG. 1, the cross-sectional area of sintered cathode 12 is defined by the horizontal length (e.g., width) of the cathode (measured as the length between protective coating 22) and the depth of the cathode (into the page).

In some examples, the cathode can be fully dense, containing pores that are closed or open, and have open porosity of up to 30%. The sintered cathode can have a thickness of 5 to 150 μm. The process for making cathodes with this conductivity require at least 1 min and up to 1 hour of residence time in an atmosphere of at least 5 vol. % oxygen at temperatures between 400° C. and 825° C. after sintering. Residence time may be provided as a hold during cooling from the high temperature sintering process or conducted as a separate processing step.

The present disclosure relates to new formulation designs for continuously casting and sintering LCO tape. Dispersant, binder, plasticizer and solvent are four key components besides solid powder in slip formulations. Specifically, the present application discloses novel dispersants in slip formulations for LCO tape that facilitate better dispersing of LCO powder. Dispersant impacts tape casting process and green tape quality. Binder and plasticizer impact tape strength, flexibility, releasability, and ability to be assembled from stacks of tapes by pressing. Solvent impacts green tape dry speed and rollability during continuous casting.

EXAMPLES

Example 1—Cathode Preparation and Characterization

Figure 3:
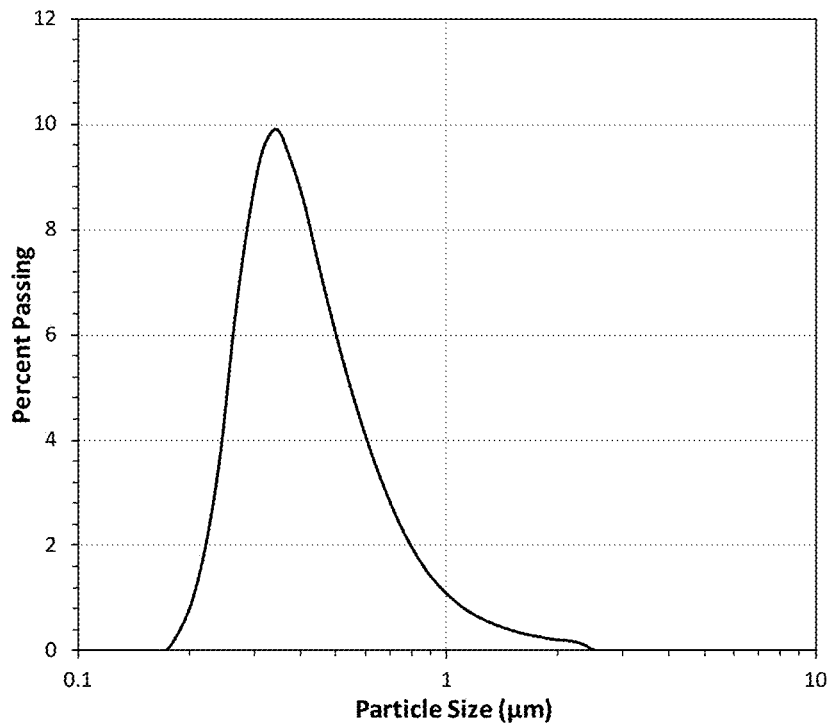
FIG. 3 illustrates particle size distribution of LCO powder after attrition milling in ceramic tape formation, according to some embodiments.

Rapidly sintered, self-standing cathodes were prepared starting with lithium cobaltite purchased from American Elements. The powder is nominally stoichiometric and XRD shows that it is single phase with peak positions and intensities consistent with layered rock-salt structures. The as-received powder was attrition milled to break agglomerates into dispersible particles with size required for sintering. Attrition milling was performed with a Union Process Mill in a batch mode and a 1 L milling jar. The charge into the mill was 2600 g of 2 mm diameter zirconia media, 400 g of as-received LCO powder, and 360 mL of isopropyl alcohol. The mill was stirred at 2000 rpm for 3 hr. A typical mean particle size after milling is between 0.35 to 0.45 µm, and a particle size distribution (varying primarily between 0.2 µm and 1.1 µm) is presented in FIG. 3, which illustrates particle size distribution of LCO powder after attrition milling in ceramic tape formation.

The powder and media were dried together and separated by sieving.

Ceramic tapes for rapid sintering were cast using the milled LCO powders. The total concentration of binder and non-volatile organics were determined to control flammability of the tape and ensure it can be de-bound at a reasonable speed in the rapid sintering process. Slip composition comprised 40-95 wt. % LCO powder, 2-40 wt. % binder, 1-5 wt. % dispersant, 1-20 wt. % plasticizer blended with remainder solvent. The LCO was dispersed in the solvent prior to addition of binder by light milling. The slip was cast into green tape with two thicknesses, 35 µm and 25 µm, to target fired thicknesses of about 25 and 20 µm, respectively. The width was 100 mm in both cases. The carrier used for casting was polyethylene terephthalate coated with silicone to facilitate release of the LCO tape.

Rapid sintering of the LCO tape to make cathodes was performed by:

(1) Green LCO tape while still on the carrier was manually cut into 300-400 mm long and 50-60 mm wide strips using scissors. The tape was manually released from the carrier.

(2) An 80 µm thick ribbon of alumina that is approximately 3 m long was threaded through a 1 m long muffle furnace operating at 1050° C. and then through an adjacent binder burn-out apparatus consisting of two opposed air bearing and onto a platform. The binder burn-out apparatus is approximately 300 mm long and has multiple heating zones that were programmed to give a linear temperature ramp between 225° C. at the entrance and 325° C. at its exit and interface with the muffle furnace. Air bearings were previously carefully aligned with an alumina "D" in the muffle furnace. The purpose of the "D" is simply to provide a flat surface for the alumina ribbon or cathode tape.

(3) The strip of LCO tape was placed carefully onto the alumina ribbon such that the long axis of each were centered. The alumina ribbon with the LCO tape was pulled at 63.5 mm/min through the binder-burn-out zone, then through the muffle furnace for sintering, and then out onto a platform at room temperature where it was collected. Cathode disks with a diameter of 12.3 mm were laser cut from the sintered LCO ribbon.

Figure 4:
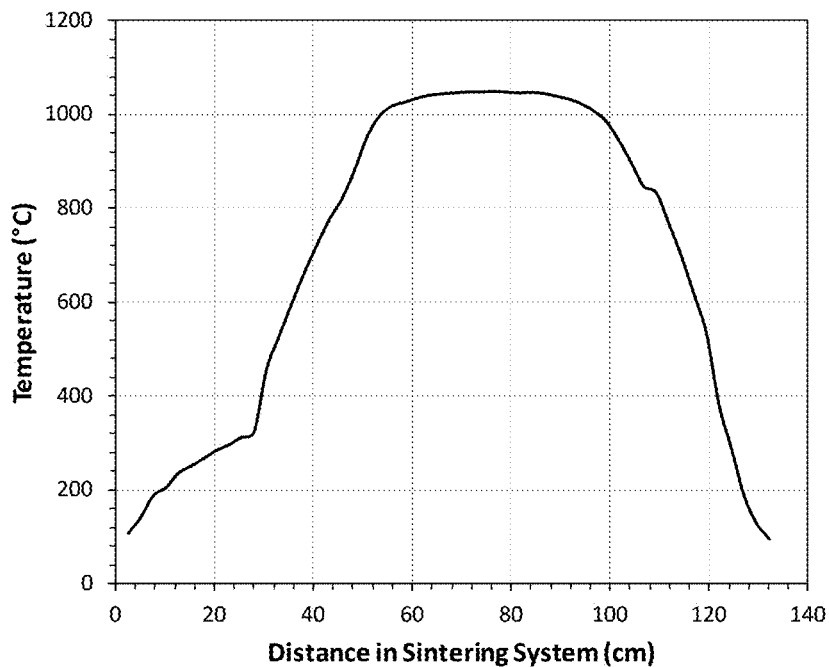
FIG. 4 illustrates temperature profile in rapid sintering apparatus starting from the entrance of the binder burn out zone, according to some embodiments.

FIG. 4 illustrates temperature profile of the LCO tape in rapid sintering apparatus starting from the entrance of the binder burn out zone. Sintering of the LCO ribbon is completed in just over 20 min. The LCO tape may be automatically released from the carrier and pulled directly through the binder burn-out apparatus and through the muffle furnace for roll-to-roll sintering of cathode ribbon. No alumina ribbon for conveyance is needed in this arrangement. The tape and ribbon, because they are thin and flexible, twist rather than break in response to the large temperature gradients. The process used herein imparts the same thermal history into the sintered LCO ribbon.

Example 2—Structure of Dispersant

FIG. 5 illustrates one example of dispersant used in LCO slip formulation for tape casting: amine (oleylamine), carboxylic acid (oleic acid), and the combination structure thereof. The combination of amine with carboxylic acid does not form of a compound having a particular molecular conformation. It can be a mixture or salt depending on the ratio of acid to amine and the interaction with other components in the slip. Therefore, the ratio of acid to amine and the structure of acid and amine are variable in order to achieve desired slurry properties such as pH, viscosity, settling speed, etc. for tape casting.

Example 3—Dispersant for Improving LCO Dispersion in Solvent

In general, FIGS. 6A-9B show that particle sizes of LCO dispersed by oleylamine (OAM) (FIGS. 6A and 6B) and dibutylamine (DBA) (FIGS. 7A and 7B) in 1-methoxy-2-propanyl acetate (MPA) solvent had smaller particles than those dispersed by fish oil (FO), oleic acid (OA), and combinations of acid with amine. This indicates that amines are better dispersants for LCO in MPA solvent, as compared to other dispersants. However, combinations of acid with amine as dispersant showed a greater amount of small LCO particles than those used amine only or acid only in isopropanol (IPA) solvent (FIGS. 8A-9B). The preferred ratio of acid-to-amine (OA:OAM or OA:DBA) was 1:3.

Table 1 discloses several examples of LCO dispersed by various dispersants such as fish oil, oleic acid, oleylamine, and the combination of oleic acid with oleylamine in 1-methoxy-2-propanyl acetate (MPA) solvent. The MPA solvent (6.102 g) and LCO (3.088 g) were maintained as constants in Exp. Nos. 1-12.

TABLE 1

MPA (g) = 6.102 g
LCO (g) = 3.088 g

| Wt. % dispersant to LCO | Exp. No. | Acid : Base | Fish oil (FO) | Oleylamine (OAM) | Oleic acid (OA) |
|---|---|---|---|---|---|
| 0 | 0 | | | | |
| 2.0 | 1 | 1:0 | 0.060 | 0.000 | |
| 3.9 | 2 | 1:1 | 0.060 | 0.060 | |
| 2.0 | 3 | 1:1 (half) | 0.030 | 0.030 | |
| 2.0 | 4 | 3:1 | 0.045 | 0.015 | |
| 2.0 | 5 | 1:3 | 0.015 | 0.045 | |
| 2.0 | 6 | 0:1 | 0.000 | 0.060 | |
| 2.0 | 7 | 1:0 | | 0.000 | 0.060 |
| 3.9 | 8 | 1:1 | | 0.060 | 0.060 |
| 2.0 | 9 | 1:1 (half) | | 0.030 | 0.030 |
| 2.0 | 10 | 3:1 | | 0.015 | 0.045 |
| 2.0 | 11 | 1:3 | | 0.045 | 0.015 |
| 2.0 | 12 | 0:1 | | 0.060 | 0.000 |

Figure 6A:
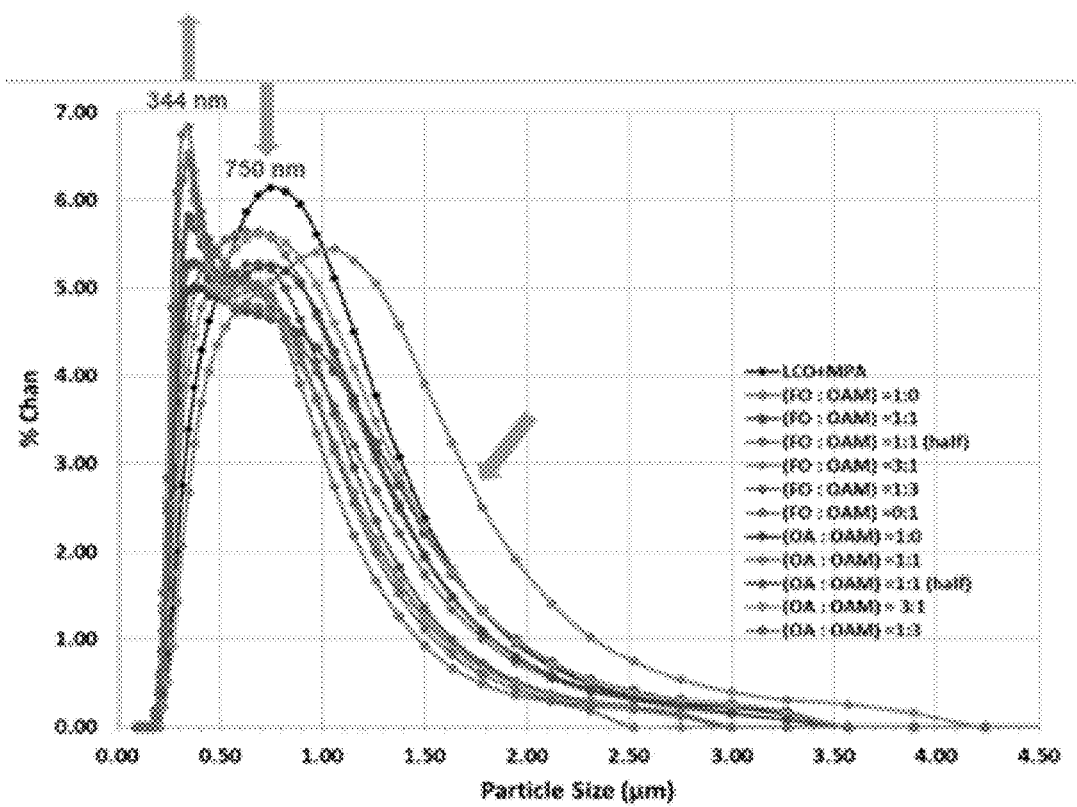

FIGS. 6A and 6B illustrate particle size distribution curves (FIG. 6A) and D10/D50/D90 particle sizes of LCO dispersed by fish oil (FO), oleylamine (OAM), oleic acid (OA), and combinations of OA with OAM in MPA solvent. FIG. 6A shows a sharp peak at 0.344 μm from the LCO samples including OAM dispersant. The highest peak at 0.344 μm was the LCO dispersed by OAM alone (Exp. No. 6), which indicates OAM may be a preferable dispersant for LCO in MPA among all samples. Moreover, from FIG. 6B, among all samples, the D50 particle size for Exp. No. 6 showed that LCO dispersed by OAM alone was also the smallest one, at 0.467 μm. The D50 particle sizes of LCO without any dispersant is larger, at 0.677 μm (Exp. No. 0). The original LCO particle size is 344 nm after milling. If particle sizes with dispersants remain around 344 nm, this indicates that the ceramic particles are well-dispersed in the solution. If particle sizes are larger than the original 344 nm (e.g., 750 nm or even larger) this indicates some LCO agglomerations/particle clusters are in solution. As binder or plasticizer will not be able to get into LCO agglomerations/clusters, the homogeneity and stability of slip composition and the quality of casted tape are non-controllable.

FIGS. 7A and 7B illustrate particle size distribution curves (FIG. 7A) and D10/D50/D90 particle sizes of LCO dispersed by fish oil (FO), dibutylamine (DBA), oleic acid (OA), and combinations of OA with DBA in MPA solvent. FIG. 7A shows a peak of the LCO dispersed by DBA alone (Sample No. 7 in FIG. 7B) is narrow and located at the position less than 0.500 μm. All other curves in FIG. 7A are broader than the curve of DBA alone, with peak positions greater than 0.500 μm. This indicates that DBA may be a preferable dispersant for LCO in MPA among all samples in this set study (i.e., FIGS. 7A and 7B). The D50 particle sizes of LCO from FIG. 7B shows that LCO dispersed by DBA alone was also the smallest one, at 0.574 μm. The D50 particle sizes of LCO without any dispersant is larger, at 0.729 μm (Sample No. 1 in FIG. 7B).

FIGS. 8A and 8B illustrate particle size distribution curves (FIG. 8A) and D10/D50/D90 particle sizes of LCO dispersed by fish oil (FO), oleylamine (OAM), oleic acid (OA), and combinations of OA with OAM in IPA solvent. FIG. 8A shows several curves having a similar peak position at less than 0.500 μm. However, the peak of LCO dispersed by the combination of OA with OAM at a ratio of OA:OAM equaling 1:3 (Sample No. 12 in FIG. 8B) in IPA was the narrowest, indicating that it was the best dispersant in this set study. A narrower LCO particle size distribution peak indicates LCO particles are dispersed very well and have better uniformity in the solution.] The D50 particle size in FIG. 8B shows that LCO dispersed by Sample No. 12 is 0.566 μm, which is slightly smaller than those dispersed by OAM alone (Sample No. 7), as well as other ratios of OA:OAM. The D50 particle sizes of LCO without any dispersant is larger, at 0.613 μm (Sample No. 1).

FIGS. 9A and 9B illustrate particle size distribution curves (FIG. 9A) and D10/D50/D90 particle sizes of LCO dispersed by fish oil (FO), dibutylamine (DBA), oleic acid (OA), and combinations of OA with DBA in IPA solvent, according to some embodiments. FIG. 9A shows that while several curves have peaks at less than 0.500 μm, the narrowest peaks are for the LCO dispersed by the combination of OA with DBA at a ratio of OA:DBA equaling 1:1 (half) (Sample No. 10) and a ratio of OA:DBA equaling 1:3 (Sample No. 12). This indicates that these were the best dispersants in this set study. The D50 particle size in FIG. 9B shows that LCO dispersed by Sample Nos. 10 and 12 is 0.57 μm, which is slightly smaller than those dispersed by DBA alone (Sample No. 7).

Example 4—Slip Composition for Addressing Dewetting

Dewetting is a problem where a thin film of slip composition ruptures on a substrate, thereby bringing critical limitations in casting inorganic thin films on substrates with desirable qualities after aging or thermal processing, such as good stability, uniformity, and continuity, because the thin films on non-wettable surfaces are unstable.

Slip compositions of Tables 2 and 3 resulted in dewetting issues on Mylar carrier films, which may be caused by binder or solvent. Mylar is polyethylene terephthalate (PET) film, which is a widely used polyester film for a variety of applications across electronics, food packaging, industrial specialty, cast and release, and graphics markets due to its balanced tensile properties, good adhesion, excellent moisture and chemical resistance, and ability to withstand temperatures from −100° F. to 300° F. Here, silicone-coated Mylar was used and designed for use as a release liner in various casting applications and relatively cheaper than other carrier films. This dewetting problem was addressed by changing solvent. Table 2 shows a slip formulation using OAM as dispersant and MPA as solvent. Table 3 shows a slip formulation using a combination of OA with OAM at a ratio of OA:OAM equaling 1:4 as dispersant and MPA as solvent.

TABLE 2

| OAM-MPA Chemical | Solvent with LCO powder and dispersants | | | | Plasticizer and binders | | |
|---|---|---|---|---|---|---|---|
| | MPA (solvent) | LCO | Oleylamine (dispersant) | Oleic Acid (dispersant) | Butvar B-79 (binder) | Dibutyl phthalate (plasticizer) | Total |
| Wt (g) | 14.000 | 20.000 | 0.400 | 0.000 | 1.000 | 0.400 | 35.80 |
| Wt. % | 39.11% | 55.87% | 1.12% | 0.00% | 2.79% | 1.12% | 1.00 |
| Density (g/ml) | 0.968 | 5.050 | 0.813 | 0.89 | 1.083 | 1.043 | |
| Vol. (ml) | 14.470 | 3.960 | 0.492 | 0.000 | 0.923 | 0.384 | 20.23 |
| Vol % | 71.53% | 19.58% | 2.43% | 0.00% | 4.56% | 1.90% | 1.00 |

TABLE 3

| OA + OAM-MPA Chemical | Solvent with LCO powder and dispersants | | | | Plasticizer and binders | | |
|---|---|---|---|---|---|---|---|
| | MPA (solvent) | LCO | Oleylamine (dispersant) | Oleic Acid (dispersant) | Butvar B-79 (binder) | Dibutyl phthalate (plasticizer) | Total |
| Wt (g) | 14.000 | 20.000 | 0.320 | 0.080 | 1.000 | 0.400 | 35.80 |
| Wt. % | 39.11% | 55.87% | 0.89% | 0.22% | 2.79% | 1.12% | 1.00 |
| Density (g/ml) | 0.968 | 5.050 | 0.813 | 0.89 | 1.083 | 1.043 | |
| Vol. (ml) | 14.470 | 3.960 | 0.394 | 0.090 | 0.923 | 0.384 | 20.22 |
| Vol % | 71.56% | 19.59% | 1.95% | 0.44% | 4.57% | 1.90% | 1.00 |

FIGS. 10A and 10B illustrate images of dewetting of slip compositions from Table 2 (FIG. 10A) and Table 3 (FIG. 10B) prepared using MPA as a solvent and cast on a Mylar film. Dewetting is a problem where a thin film of the slip composition ruptures on a substrate, as shown in the figures. The combination of OA with OAM (FIG. 10B) was slightly better than OAM (FIG. 10A) because the combination formed larger continuous thin film areas than that of OAM alone. While the thin film uniformity made from the combination slip on the Mylar carrier film was also better than that from the OAM alone slip, both dried green tapes had some degree of residual on the Mylar film after releasing.

Figure 11B:
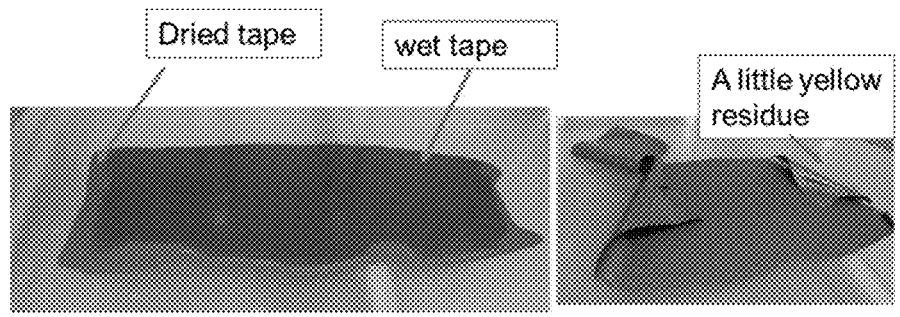

FIGS. 11A and 11B illustrate images of improvements to dewetting solved by using ethyl isobutyrate (EIB) as the solvent instead of MPA to cast slip compositions from Table 2 (FIG. 11A) and Table 3 (FIG. 111B) on a Mylar film. A uniform, continuous, and smooth film is formed on the Mylar carrier film after new slip composition dried at ambient condition. The dried film was able to release from Mylar substrate without residue. EIB replaces MPA as the solvent in slip formulations from Table 2 and Table 3. With the exception of solvent replacement, other components and amounts were kept the same as the slip compositions in Table 2 and Table 3. Green tapes using OAM as the dispersant (FIG. 11A) easily releases without residual on the Mylar film. Green tapes using the combination of OA with OAM as the dispersant (FIG. 111B) releases with a small amount of light brown residual on the Mylar film.

Figure 12A:
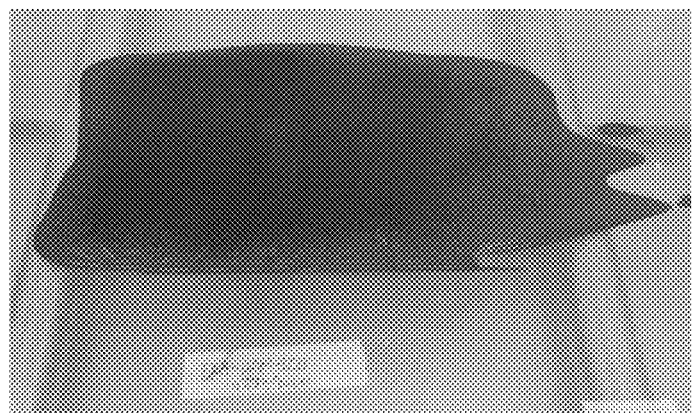
FIGS. 12A and 12B illustrate pictures of slip compositions prepared using IPA as the solvent to cast slip compositions from Table 2 (FIG. 12A) and Table 3 (FIG. 12B) on a Mylar film, according to some embodiments.
Figure 12B:
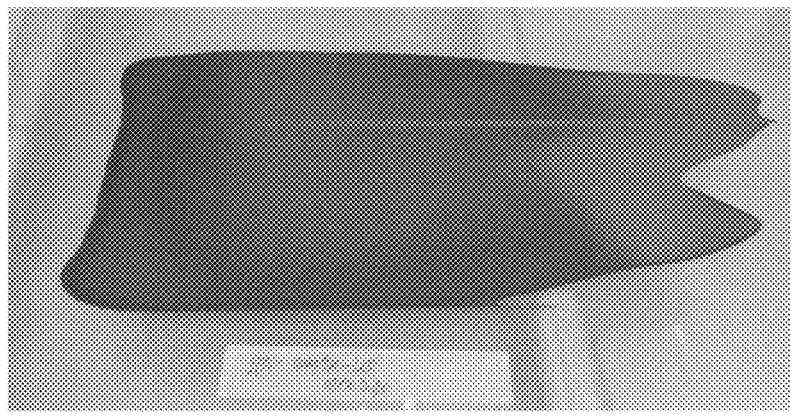

FIGS. 12A and 12B illustrate images of slip compositions prepared using IPA as the solvent to cast slip compositions from Table 2 (FIG. 12A) and Table 3 (FIG. 12B) on a Mylar film. A uniform, continuous, and smooth film is formed on the Mylar substrate after new slip composition dried at ambient condition. However, the dried film releases with some residue on the Mylar substrate, indicating the interaction between the slip composition and substrate was too strong. As is shown, there is no dewetting problem on the Mylar film for either slip made from IPA solvent. However, the green tape made from OAM dispersant (FIG. 12A) does show some cracks after the tape dried. The green tape made from the combination of OAM and OA as dispersant (FIG. 12B) does not have cracks after the tape dried.

Thus, as is shown from FIGS. 10A-12B, slip compositions of Table 2 and Table 3 may result in varying dewetting performance on Mylar carrier films depending on which solvent is used in the casting process.

Example 5—Slip Composition for Continuous Tape Casting

Continuous tape casting enables roll-to-roll or continuous in-line processing for reducing cost of ribbon ceramics. The slip for continuous tape casting requires a stable slip for making uniform tape and a reasonably fast drying speed of the casted tape to allow rolling of the green tape. Table 4 shows a slip formulation that was continuously casted and for which LCO tape was successfully rolled at room temperature with air flow, without sticky problem. If the solvents in the casted green tapes are not completely dry during continuous tape casting, the casted green tapes become tacky, which causes the green tapes to become stuck on the carrier film after they are rolled and resulting in the green tapes damaging when the green tapes are released.

TABLE 4

| OAM-EIB-E2046 Chemical | Solvent with LCO powder and dispersants | | | Plasticizer and binders | | |
|---|---|---|---|---|---|---|
| | EIB (solvent) | LCO | Oleylamine (dispersant) | Elvcite 2046 (binder) | Dibutyl phthalate (plasticizer) | Total |
| Wt (g) | 56.000 | 80.000 | 1.600 | 4.000 | 1.600 | 143.20 |
| Wt. % | 39.11% | 55.87% | 1.12% | 2.79% | 1.12% | 1.00 |
| Density (g/ml) | 0.865 | 5.050 | 0.813 | 1.083 | 1.043 | |

TABLE 4-continued

| OAM-EIB- | Solvent with LCO powder and dispersants | | | Plasticizer and binders | | |
| --- | --- | --- | --- | --- | --- | --- |
| E2046 Chemical | EIB (solvent) | LCO | Oleylamine (dispersant) | Elvcite 2046 (binder) | Dibutyl phthalate (plasticizer) | Total |
| Vol. (ml) | 64.740 | 15.842 | 1.968 | 3.693 | 1.534 | 87.78 |
| Vol % | 73.75% | 18.05% | 2.24% | 4.21% | 1.75% | 1.00 |

Example 6—Slip Composition and Sintering Process for Preventing Tape Burning Green tape comprising organic components burned out quickly during the sintering process at around 200° C. in air due to exothermic reactions between the released oxygen from LCO and organic materials. By manipulating slip formulation and sintering process, green tape burning may be controlled. A quick burnout of organic component during thermal process is problematic because the tapes become ash after vigorous burning.

Figure 13:
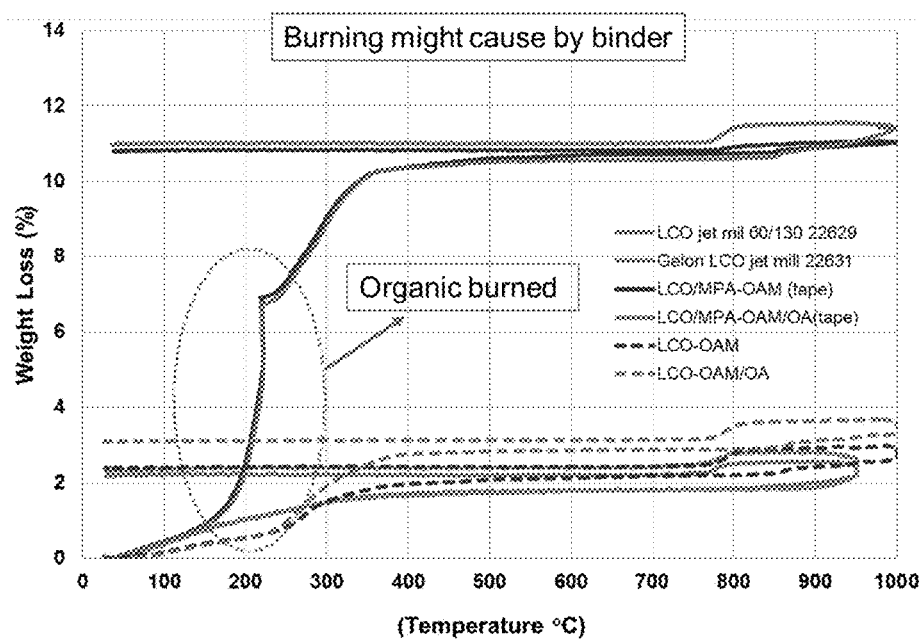
FIG. 13 illustrates thermogravimetric analysis (TGA) of various LCO green tapes and powders, according to some embodiments.

FIG. 13 illustrates thermogravimetric analysis (TGA) of various LCO green tapes and powders, according to some embodiments. TGA analysis was conducted using a TGA701 Thermogravimetric Analyzer by LECO Corp. Heating rate was 100° C./hours under air flow. Weight loss curves from TGA analysis show that LCO powders without binder experience gradual weight loss between 200-400° C. However, LCO green tapes with binder experience a rapid weight loss between 180-220° C., indicating that a large amount of organic species has been quickly burned due to binder composition and concentration in this temperature zone.

Figure 14A:
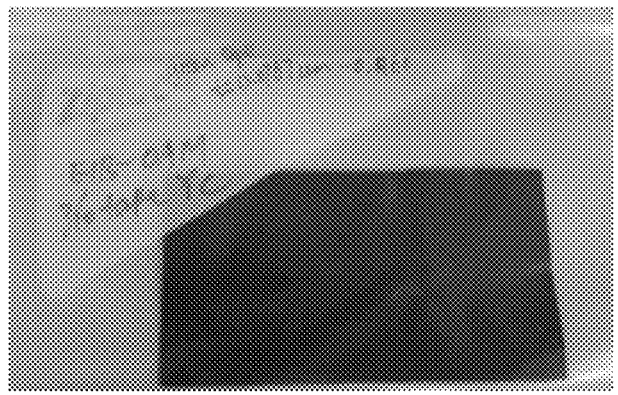
Figure 14B:

FIGS. 14A-14C illustrate images of LCO green tape prepared with a slip composition comprising EIB solvent and OAM dispersant (FIG. 14A); the residual of the LCO green tape ignited at binder burnout (BBO) processing when the LCO green tape was pulled into a tube furnace at 2.3 in/min speed (FIG. 14B); and a successfully sintered LCO tape after the LCO green tape was pulled into a tube furnace at 1.6 in/min speed and sintered at 1050° C. (FIG. 14C). The BBO process was a linear temperature profile from 225 to 325° C. in air with 6 SCFM flow as shown in FIG. 4. All three zones of the furnace were set to 1050° C. for tape sintering. Slower pull speeds in the process of FIG. 14C (1.6 in/min versus 2.3 in/min speed of FIG. 14B) provide additional time for flameless pyrolysis and vaporizing organic components from the green tape. The solvent has completely dried during tape casting or below 100° C., so it does not affect flameless pyrolysis. The dispersant molecules selected herein have lower heats of vaporization compared to polymer dispersants, which vaporize below 200° C. to limit thermal runaway of LCO. The tape survived burn-out and sintered reasonably well at 1050° C.

FIGS. 15A and 15B illustrate scanning electron microscopy (SEM) cross-section (FIG. 15A) and top view (FIG. 15B) images of LCO tape sintered at 1050° C. The green tape was prepared from a slip composition comprising OAM dispersant, Butvar B-79 binder, dibutyl phthalate plasticizer, and EIB solvent. The SEM images show a tape having a dense structure. Particle shape appears to have a rice-grain top view shape and a fiber texture from cross section review.

Thus, the present disclosure relates generally to new formulation designs for continuously casting and sintering LCO tape. Dispersant, binder, plasticizer and solvent are four key components besides solid powder in slip formulations. Dispersant impacts tape casting process and green tape quality. Binder and plasticizer impact tape strength, flexibility, releasability, and ability to be assembled from stacks of tapes by pressing. Solvent impacts green tape dry speed and rollability during continuous casting.

Specifically, the present application discloses novel dispersants in slip formulations for LCO tape that facilitate better dispersing of LCO powder. The role of dispersants in tape casting is very important because it is central to dispersion, wetting, high density, porosity, deflocculation, slip stability, and green tape strength. It is also a starting point for tape casting with fine powder. After solvent evaporates, the dispersant permits the particles to settle into a densely packed green tape. Therefore, an effective dispersant can increase the density and strength of the green tape.

Advantages for the disclosed formulation include: (1) cost reduction (the dispersant, solvent, and binder disclosed herein may reduce raw materials cost. Most of all, the formulation developed herein can be used for continuous tape casting, which allows high-throughput production and lowers manufacturing costs); (2) high variability (based on interactions between dispersants with solvent, binder, and plasticizer, the ratio of acid-to-amine can be variable to achieve desired slurry properties such as pH, viscosity, settling speed, etc. for tape casting. The chain length and structure of organic acid or amine can also be selected based on the hydrophobicity and compatibility with solvent as well as the interaction with carrier film); (3) low temperature for organic removal to solve green tape burning during debinding process (the LCO green tapes have burning issues when temperatures greater than 200° C. are utilized due to exothermic reactions between oxygen released from LCO and organic materials. Dispersant molecules described herein have lower heats of vaporization—as compared to polymer dispersants—which can be vaporized below 200° C. to limit thermal runaway of LCO); (4) high tunability of tape structure (well-dispersed LCO particles by single molecules have less steric hindrance comparing to polymer dispersants, allowing magnetic field application to achieve a designed alignment of the electrode to improve energy density and practical realization of all solid-state Li-ion secondary batteries); (5) variability in size, shape, and thickness (thickness of LCO green tape may be made in a range of 2-500 μm. Sintered LCO thin tape can be cut into designed size and shape for application).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

As used herein, the term "porosity" is described as a percent by volume (e.g., at least 10% by volume, or at least 30% by volume), where the "porosity" refers to the portions of the volume of the sintered article unoccupied by the inorganic material.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As utilized herein, "optional," "optionally," or the like are intended to mean that the subsequently described event or circumstance can or cannot occur, and that the description includes instances where the event or circumstance occurs and instances where it does not occur. The indefinite article "a" or "an" and its corresponding definite article "the" as used herein means at least one, or one or more, unless specified otherwise. References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A method for forming a sintered composition, comprising:
   providing a slurry precursor including a lithium-, sodium-, or magnesium-based compound;
   tape casting the slurry precursor to form a green tape; and
   sintering the green tape at a temperature in a range of 500° C. to 1350° C. for a time in a range of less than 60 min to form a sintered composition,
   wherein:
      the slurry precursor further comprises a solvent and dispersant, wherein the dispersant comprises combinations, mixtures, or salts of an amine compound and an carboxylic acid compound, and a weight ratio of the carboxylic acid compound to the amine compound is at least 1:4.

2. The method of claim 1, wherein the amine compound comprises oleylamine, dibutylamine, or combinations thereof.

3. The method of claim 1, wherein the amine compound comprises at least one amino group, at least one imino group, or combinations thereof,
   wherein the at least one amino group or at least one imino group contains alkyl chains or aromatic rings, and
   wherein the amine compound has less than 30 carbon atoms.

4. The method of claim 1, wherein the carboxylic acid compound comprises oleic acid.

5. The method of claim 1, wherein the carboxylic acid compound comprises R—COOH structured molecules, where R is an alkyl chain or aromatic ring, and wherein the R—COOH structured molecules have less than 30 carbon atoms.

6. The method of claim 1, wherein the lithium-, sodium-, or magnesium-based compound has a D50 particle size of at most 0.6 μm.

7. The method of claim 1, wherein the solvent comprises 1-methoxy-2-propanyl acetate (MPA), isopropanol (IPA), ethyl isobutyrate (EIB), ketones, aromatic hydrocarbons, amines, nitrated hydrocarbons, chlorinated hydrocarbons, or combinations thereof.

8. The method of claim 1, wherein the solvent is non-polar with a dielectric constant at 20° C. of less than 20.

9. The method of claim 1, wherein the lithium-based compound comprises at least one of lithium cobaltite (LCO), lithium manganite spinel (LMO), lithium nickel cobalt aluminate (NCA), lithium nickel manganese cobalt oxide (NMC), lithium iron phosphate (LFP), lithium cobalt phosphate (LCP), lithium titanate, lithium niobium tungstate, lithium titanium sulfide, or combinations thereof.

10. The method of claim 1, wherein the lithium-, sodium-, or magnesium-based compound is at least 50 wt. % of the total slurry precursor.

11. The method of claim 1, wherein the sodium- or magnesium-based compound comprises: at least one of $NaVPO_4F$, $NaMnO_2$, $Na_{2/3}Mn_{1-y}Mg_yO_2$ ($0<y<1$), $Na_2Li_2Ti_5O_{12}$, $Na_2Ti_3O_7$, $MgCr_2O_4$, or $MgMn_2O_4$.

12. The method of claim 1, wherein the slurry precursor further comprises at least one of binder and plasticizer.

13. The method of claim 12, wherein the tape casting comprises:
   forming the slurry precursor to a sheet configuration having a thickness in a range of 5 μm to 100 μm; and
   drying the sheet configuration such that a combination of the at least one solvent, dispersant, and plasticizer does not exceed 10 wt. % of the dried sheet.

14. The method of claim 13, further comprising:
   debinding the dried sheet at a predetermined temperature, wherein the debinding and the sintering are conducted simultaneously.

15. The method of claim 13, further comprising:
   pyrolyzing organics in the dried sheet at a temperature in a range of 175° C. to 350° C.

16. The method of claim 1, wherein the sintering is conducted for less than 45 min and comprises continually feeding the green tape through a sintering chamber at a predetermined rate.

17. The method of claim 1, wherein:
   a final thickness of the sintered composition is in a range of 2 μm to 100 μm immediately after the sintering without further processing.

18. The method of claim 1, further comprising:
   continuous tape casting the sintered composition.

19. An energy device, comprising:
   a first sintered, non-polished electrode having a first surface and a second surface;

a first current collector disposed on the first surface of the first electrode;

an electrolyte layer disposed on the second surface of the first electrode;

a second electrode disposed on the electrolyte layer; and a second current collector is disposed on the second electrode, wherein the first electrode comprises the sintered composition of claim 1.

20. The energy device of claim 19, wherein the electrolyte layer has a conductivity of at least $10^{-6}$ S/cm.

21. The energy device of claim 19, wherein the first electrode is a substrate of the energy device.

22. The method of claim 1, wherein the carboxylic acid compound comprises oleic acid.

23. The method of claim 1, wherein the carboxylic acid compound comprises R—COOH structured molecules, where R is an alkyl chain or aromatic ring, and wherein the R—COOH structured molecules have less than 30 carbon atoms.

24. A method for forming a sintered composition, comprising:

providing a slurry precursor including a lithium-, sodium-, or magnesium-based compound;

tape casting the slurry precursor to form a green tape; and sintering the green tape at a temperature in a range of 500° C. to 1350° C. for a time in a range of less than 60 min to form a sintered composition, wherein:

the slurry precursor further comprises a solvent and dispersant, wherein the dispersant comprises combinations, mixtures, or salts of an amine compound and an carboxylic acid compound, and a weight ratio of the carboxylic acid compound to the amine compound is from 1:3 to 3:1.

25. The method of claim 24, wherein the amine compound comprises oleylamine, dibutylamine, or combinations thereof.

26. The method of claim 24, wherein the amine compound comprises at least one amino group, at least one imino group, or combinations thereof, wherein the at least one amino group or at least one imino group contains alkyl chains or aromatic rings, and wherein the amine compound has less than 30 carbon atoms.

27. The method of claim 24, wherein the lithium-based compound comprises at least one of lithium cobaltite (LCO), lithium manganite spinel (LMO), lithium nickel cobalt aluminate (NCA), lithium nickel manganese cobalt oxide (NMC), lithium iron phosphate (LFP), lithium cobalt phosphate (LCP), lithium titanate, lithium niobium tungstate, lithium titanium sulfide, or combinations thereof.

* * * * *